US009698919B1

United States Patent
Nielsen et al.

(10) Patent No.: US 9,698,919 B1
(45) Date of Patent: Jul. 4, 2017

(54) METHOD AND APPARATUS FOR SPECTRAL STITCHING DISCONTINUOUS SPECTRA USING REFERENCE CHANNEL, PILOT TONES AND COMB SIGNAL

(71) Applicant: Keysight Technologies, Inc., Minneapolis, MN (US)

(72) Inventors: Troels Studsgaard Nielsen, Aalborg (DK); Jan Verspecht, Londerzeel (BE)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/981,861

(22) Filed: Dec. 28, 2015

(51) Int. Cl.
H04B 1/10 (2006.01)
H04B 17/345 (2015.01)

(52) U.S. Cl.
CPC .................................. H04B 17/345 (2015.01)

(58) Field of Classification Search
CPC . H04B 1/00; H04B 1/40; H04B 17/00; H04B 17/0042; H04B 17/23; H04B 17/29; H04B 17/345; H04L 25/0204; H04L 27/2647; H04L 27/2675; G01R 23/20; G01R 25/00; G01R 27/28; G01R 31/00; G01R 35/005
See application file for complete search history.

(56) References Cited

U.S. PATENT DOCUMENTS

| | | |
|---|---|---|
| 3,968,427 A | 7/1976 | Sharrit |
| 3,986,113 A | 10/1976 | Vifian |
| 6,018,702 A | 1/2000 | Luiz et al. |
| 7,801,505 B2 | 9/2010 | VanWiggeren et al. |
| 8,155,904 B2 | 4/2012 | Dvorak et al. |
| 8,588,703 B2 | 11/2013 | Pickerd et al. |
| 8,849,602 B2 | 9/2014 | Nishimura et al. |
| 8,891,639 B2 | 11/2014 | Vanden Bossche |

(Continued)

FOREIGN PATENT DOCUMENTS

EP   2 613 460 A1   10/2013

OTHER PUBLICATIONS

Yichi Zhang et al., "Dense Spectral Grid NVNA Phase Measurements Using Vector Signal Generators", IEEE Transactions on Instrumentation and Measurement, vol. 63, No. 12, Dec. 2014, pp. 2983-2992.

(Continued)

*Primary Examiner* — Thanh Le

(57) ABSTRACT

A system and method sequentially measure the amplitude and phase of a signal in each of two or more noncontiguous spectrum segments (e.g., harmonics) which each include two or more portions which together span the spectrum segment, using a local oscillator (LO) signal whose frequency and phase change for each measurement. The measured phase of the signal for at least one of the portions in each spectrum segment is adjusted to account for the change of phase in the LO signal from measurement of one portion to another, using phases of one or more pilot tones measured in each portion. The phase-adjusted measurements of the output signal in the various portions are stitched together to determine the amplitude and phase of the output signal across the spectrum segment. The phase relationships between the spectrum segments are determined from phases of comb teeth of a comb signal measured in each spectrum segment.

20 Claims, 12 Drawing Sheets

(56) References Cited

U.S. PATENT DOCUMENTS

| | | | |
|---|---|---|---|
| 9,252,895 B1 | 2/2016 | Verspecht | |
| 2005/0141626 A1* | 6/2005 | Lee | H04L 25/0232 375/260 |
| 2009/0216468 A1 | 8/2009 | Anderson et al. | |
| 2012/0269252 A1 | 10/2012 | Ward | |
| 2013/0154611 A1 | 6/2013 | Pate et al. | |
| 2014/0050259 A1 | 2/2014 | Azizi et al. | |
| 2014/0269863 A1 | 9/2014 | Fan et al. | |
| 2014/0269882 A1* | 9/2014 | Thompson | H04L 25/0212 375/232 |
| 2014/0368216 A1 | 12/2014 | Pailloncy et al. | |
| 2015/0180416 A1* | 6/2015 | Fernandez | H04B 1/00 455/326 |
| 2015/0312078 A1* | 10/2015 | Bogdan | H04L 27/2656 375/226 |

OTHER PUBLICATIONS

Mohammed El Yaagoubi et al., "Time-Domain Calibrated Measurements of Wideband Multisines Using a Large-Signal Network Analyzer," IEEE Transactions on Microwave Theory and Techniques, vol. 56, No. 5, May 2008, pp. 1180-1192.

Youngseo Ko et al., "Multi-Harmonic Broadband Measurements using an Large Signal Network Analyzer," IEEE Microwave Measurements Conference, May 28, 2010, pp. 1-6.

Fabien De Groote et al,, "Pulsed Multi-Tone Measurements for Time Domain Load Pull Characterizations of Power Transistors," IEEE Microwave Measurement Conference, 2009, pp. 1-4.

Peter Blockley et al., "Mixer-Based, Vector-Corrected, Vector Signal/Network Analyzer Offering 300kHz-20GHz Bandwidth and Traceable Phase Response," 2005 IEEE MTT-S International Microwave Symposium Digest, 2005, pp. 1497-1500.

Ex-Parte Quayle Office Action Dated Jul. 14, 2016 in co-pending U.S. Appl. No. 14/824,000.

Notice of Allowance dated Sep. 30, 2016 in co-pending U.S. Appl. No. 14/824,000.

Office Action dated Nov. 10, 2016 in co-pending U.S. Appl. No. 14/823,985.

Office Action dated Dec. 16, 2015 in co-pending U.S. Appl. No. 14/824,000.

Notice of Allowance dated Nov. 14, 2016 in co-pending U.S. Appl. No. 14/824,000.

Office Action dated Jan. 31, 2017 in co-pending U.S. Appl. No. 14/848,971.

Notice of Allowance dated Mar. 10, 2017 co-pending U.S. Appl. No. 14/824,000.

\* cited by examiner

--Prior Art--

--Prior Art--

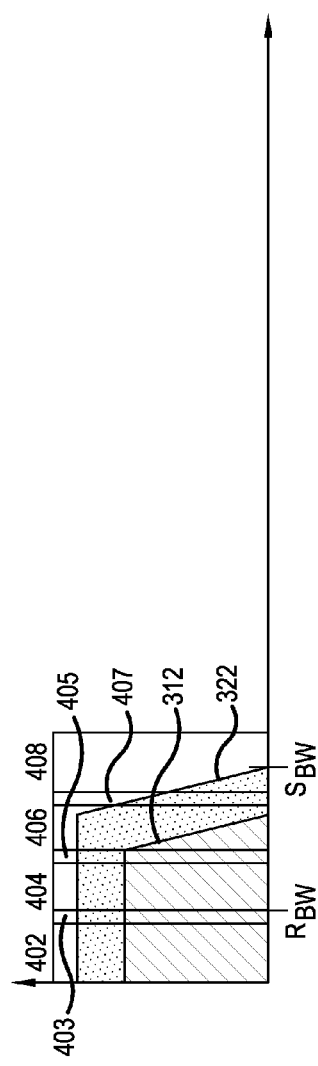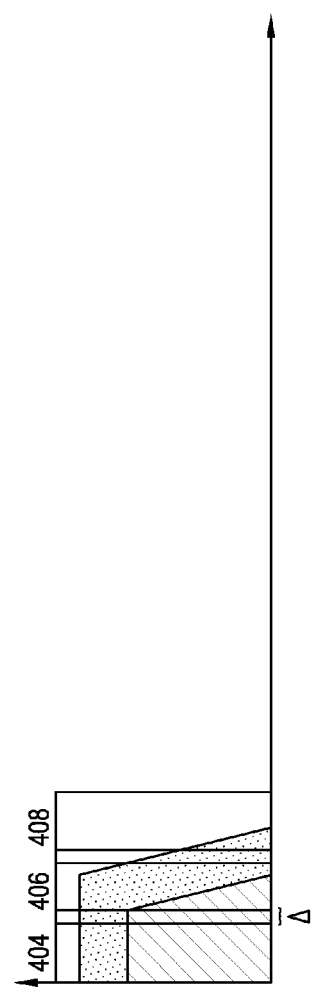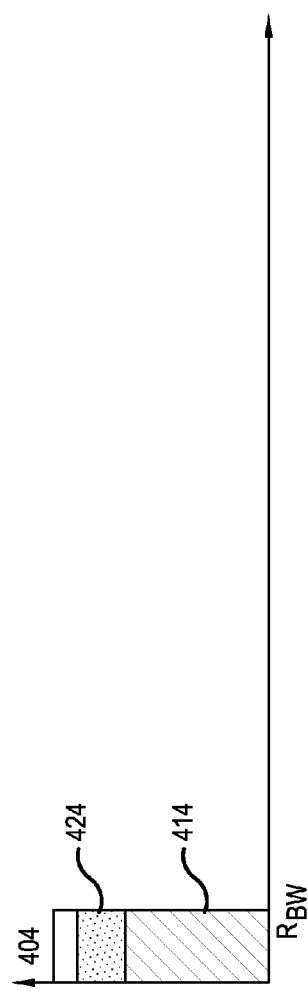

METHOD AND APPARATUS FOR SPECTRAL STITCHING DISCONTINUOUS SPECTRA USING REFERENCE CHANNEL, PILOT TONES AND COMB SIGNAL

BACKGROUND

In many situations, it is desired to be able to provide an accurate and complete measurement of one or more periodically modulated signals using a receiver or measurement device whose bandwidth is less than the bandwidth of the periodically modulated signal.

For example, one may want to measure the error vector magnitude (EVM) of a power amplifier (PA), whereby the PA is excited by a contiguously aggregated 5-carrier LTE-A signal with a bandwidth of 100 MHz and a fundamental carrier frequency ($f_C$) of 1.8 GHz. Because of spectral regrowth, the bandwidth of the fundamental PA output signal easily exceeds 300 MHz. Moreover, in the case of a broadband PA with higher-order intrinsic nonlinearities, the amplifier output signal will contain energy also around the harmonic carriers, which must also be measured.

FIG. 1 illustrates an example of such an amplifier output signal 110, including eleven harmonics $F_c$ through $11F_C$. In general, as in the example of FIG. 11, the power level of higher order harmonics declines substantially. In many cases, only the first three or more harmonics have significant energy to be of concern. And in the case of the input signal to the amplifier, typically there is only significant energy in the fundamental frequency—the energy in the second, third, and other harmonics is typically −60 dBc or less with respect to the fundamental frequency.

Now we consider a case wherein the difference between the minimum and the maximum frequency contained in the spectrum of each harmonic exceeds the measurement bandwidth of the measurement instrument, and wherein the difference between the maximum frequency in one harmonic spectrum and the minimum frequency in the next harmonic spectrum also exceeds the measurement bandwidth of the measurement instrument.

FIG. 2 illustrates an example of this situation, in particular showing the first three harmonics 110-1, 110-2 and 110-3 of output signal 100 compared to an example measurement bandwidth RBW.

FIGS. 3A-3C illustrate in greater detail a problem with measuring the spectrum of such an output signal with a measurement instrument whose bandwidth is less than the bandwidth of any of the harmonics. For simplification of illustration and explanation, FIGS. 3A-3C illustrate measurement of only a single one of the harmonics of the output signal.

FIG. 3A shows an example frequency spectrum 320 of one harmonic of an output signal of a device under test (e.g., an amplifier) in response to a periodically modulated input signal.

FIG. 3B shows the example frequency spectrum 322 of the harmonic of the output signal of the device under test downconverted to baseband with the first mixing frequency LO1, together with the limited bandwidth $R_{BW}$ of a filter 330 of a receiver which is used to measure and characterize the periodically modulated input signal and the output signal of the device under test. Here it is assumed the bandwidth of the downconverted output signal of the device under test is $S_{BW} > R_{BW}$.

FIG. 3C shows the portion 324 of the spectrum of the harmonic of the output signal of the device under test which is actually able to be measured and characterized by the receiver with the limited bandwidth $R_{BW}$. As denoted in FIG. 3B, a portion 323 of the harmonic of the spectrum of the output signal of the device under test is not measured by the receiver because of the limited bandwidth $R_{BW}$.

Furthermore, since FIGS. 3A-3C only illustrate measurement of one harmonic of an output signal when it is desired to measure several harmonics of interest, the actual situation is much worse.

Thus it would be desirable to provide a convenient and reliable method and system to measure and characterize a periodically modulated signal, and an output signal of a device under test (DUT) produced in response to the periodically modulated signal, using a receiver whose bandwidth is less than the bandwidth of the periodically modulated signal itself and/or the bandwidth of the output signal. It would further be desirable to provide such a system and method which can provide accurate measurements of phase sensitive characteristics, such as the error-vector-magnitude (EVM), for a DUT. It would still further be desirable to provide such a system and method which can provide accurate measurements of phase sensitive characteristics, such as the error-vector-magnitude (EVM), for a DUT over multiple harmonics of the fundamental frequency.

SUMMARY

According to one aspect of the invention, a method comprises: receiving from a device under test an output signal having an output signal spectrum including at least two output signal spectrum segments which are separated and spaced apart from each other in frequency; providing first and second pilot tones; providing a comb signal having a plurality of comb teeth having known phase differences therebetween; combining the first and second pilot tones and the comb signal to produce a reference signal; for each of the output signal spectrum segments: sequentially converting portions of the output signal spectrum segment down to a first intermediate frequency (IF) signal in a first IF channel by mixing the output signal with a local oscillator (LO) signal, wherein a frequency of the LO signal is changed for each sequential conversion, and measuring an amplitude and phase of the first IF signal as a function of frequency for each of the sequentially converted portions of the output signal spectrum segment using a measurement device whose measurement bandwidth for any fixed frequency of the LO signal is less than the bandwidth of the output signal spectrum segment and is also less than an amount by which the output signal spectrum segments are separated and spaced apart from each other in frequency; during each sequential conversion, mixing the reference signal, including the first and second pilot tones, with the LO signal to produce converted first and second pilot tones, selecting frequencies of the first and second pilot tones such that for each sequential conversion the converted first and second pilot tones are spaced apart from each other within a reference channel, wherein for each sequential conversion a frequency of one of the first and second pilot tones does not change from an immediately preceding conversion, and a frequency of another one of the first and second pilot tones does change from the immediately preceding conversion, wherein the one of the first and second pilot tones which does not change alternates from sequential conversion to sequential conversion, and wherein for at least one of the sequential conversions, mixing the reference signal with the LO signal produces at least one converted comb tooth in the reference channel; measuring a phase of the converted comb tooth in the reference channel for at least one of the sequential conversions; measuring a phase of each of the converted first and second pilot tones in the reference channel for each sequential conversion; adjusting the measured phase of the first IF signal as a function of frequency for one or more of the sequentially converted portions of the output signal spectrum segment using the measured phases of the converted first and second pilot tones to produce phase-adjusted measurements of the IF signal; and stitching together the phase-adjusted measurements of the first IF signal to produce a measurement of the amplitude and phase of the output signal spectrum segment as a function of frequency; and ascertaining relative phase differences between the plurality of output signal spectrum segments using the measured phases of the converted comb teeth in the reference channel for each of the output signal spectrum segments and the known phase differences between the comb teeth in the comb signal.

In some embodiments, the first IF bandwidth of the first IF channel is approximately the same as the reference bandwidth of the reference channel.

In some embodiments, the amount by which the frequency of the LO signal is changed for each sequential conversion is about equal to a difference between the frequencies of the first and second pilot tones.

In some versions of these embodiments, the frequency of the one of the first and second pilot tones which does change from the immediately preceding conversion changes by about twice the amount by which the frequency of the LO signal is changed from the immediately preceding conversion.

In some embodiments, adjusting the measured phase of the first IF signal as a function of frequency for one or more of the sequentially converted portions of the output signal spectrum segment using the measured phases of the converted first and second pilot tones comprises: for at least a current one of the sequential conversions, determining a phase adjustment to be applied to the measured phase of the first IF signal as a function of frequency as a difference between: (1) the phase of the one of the first and second pilot tones which does change from the immediately preceding conversion, as measured for the current sequential conversion, and (2) the phase of the one of the first and second pilot tones which does change from the immediately preceding conversion, as measured for an immediately preceding sequential conversion; and applying the determined phase adjustment to the measured phase of the first IF signal as a function of frequency for the current sequential conversion.

In some embodiments, the method further comprises: receiving a second signal, having a second signal spectrum comprising a plurality of second signal spectrum segments which are separated and spaced apart from each other in frequency; for each of the plurality of second signal spectrum segments: during each sequential conversion of the portions of the output signal spectrum segment, sequentially converting portions of the second signal spectrum segment down to a second intermediate frequency (IF) signal in a second IF channel by mixing the second signal with the LO signal, and measuring an amplitude and phase of the second IF signal as a function of frequency for each of the sequentially converted portions of the second signal spectrum segment using a second measurement device whose measurement bandwidth for any fixed frequency of the LO signal is less than the output signal bandwidth and is also less than an amount by which the output signal spectrum segments are separated and spaced apart from each other in frequency; adjusting the measured phase of the second IF signal as a function of frequency for one or more of the sequentially converted portions of the second signal spectrum segment using the measured phases of the converted first and second pilot tones to produce phase-adjusted measurements of the second IF signal; and stitching together the phase-adjusted measurements of the second IF signal to produce a measurement of the amplitude and phase of the second signal across the second signal spectrum segment as a function of frequency; and ascertaining relative phase differences between the plurality of second signal spectrum segments using the measured phases of the converted comb teeth in the reference channel for each of the second signal spectrum segments and the known phase differences between the comb teeth in the comb signal, wherein the second signal is one of: an input signal which is also supplied to an input of the device under test and in response to which the device under test generates the output signal; a reflected signal produced from the input of the device under test; and a reflected signal produced from the output of the device under test.

According to another aspect of the invention, a system is provided for measuring at least one characteristic of an output signal of a device under test (DUT), the output signal having an output signal spectrum which includes at least two output signal spectrum segments which are separated and spaced apart from each other in frequency. The system comprises: a local oscillator (LO) configured to generate an LO signal having an LO frequency; a first signal generator configured to generate a first pilot tone; a comb signal generator configured to generate a comb signal having a plurality of comb teeth having known phase differences therebetween; a first frequency converter configured to mix the output signal with the LO signal to produce an intermediate frequency (IF) signal in a first IF channel; a reference frequency converter configured to mix the first pilot tone and the comb signal with the LO signal to produce a converted first pilot tones within a reference IF channel; a first measurement device connected to an output of the first frequency converter, the first measurement device having a first measurement bandwidth which for any fixed frequency of the LO signal is less than the bandwidth of at least one of the output signal spectrum segments; a reference measurement device connected to an output of the reference frequency converter, the reference measurement device having a reference measurement bandwidth which for any fixed frequency of the LO signal is less than the bandwidth of the at least one of the output signal spectrum segments; a controller configured to control tuning of the LO and the first signal generators to measure the amplitude and phase of the output signal spectrum as a function of frequency including relative phases of the at least two output signal spectrum segments which are separated and spaced apart from each other in frequency, including using various ones of the comb teeth to determine a relative phase of the output signal spectrum between the at least two output signal spectrum segments.

In some embodiments, the first measurement bandwidth of the first measurement device is approximately the same as the reference measurement bandwidth of the reference measurement device, and the first measurement bandwidth for any fixed frequency of the LO signal is less than the bandwidth of both of the at least two output signal spectrum segments.

In some embodiments the system further comprises a second signal generator configured to generate a second pilot tone, wherein the reference signal includes the second pilot tone, wherein the reference frequency converter is further configured to mix the second pilot tone with the LO signal to produce a converted second pilot tone within the reference channel, and wherein the controller is configured to control the system to execute a procedure comprising: for each of the output signal spectrum segments: sequentially converting portions of the output signal spectrum segment down to the intermediate frequency (IF) signal in the first IF channel by mixing the output signal with the local oscillator (LO) signal, wherein a frequency of the LO signal is changed for each sequential conversion, and measuring an amplitude and phase of the IF signal as a function of frequency for each of the sequentially converted portions of the output signal spectrum segment using the first measurement device; during each sequential conversion, mixing the reference signal, including the first and second pilot tones, with the LO signal to produce the converted first and second pilot tones, selecting frequencies of the first and second pilot tones such that for each sequential conversion the converted first and second pilot tones are spaced apart from each other within the reference channel, wherein for each sequential conversion a frequency of one of the first and second pilot tones does not change from an immediately preceding conversion, and a frequency of another one of the first and second pilot tones does change from the immediately preceding conversion, wherein the one of the first and second pilot tones which does not change alternates from sequential conversion to sequential conversion, and wherein for at least one of the sequential conversions, mixing the reference signal with the LO signal produces at least one converted comb tooth in the reference channel; measuring a phase of the converted comb tooth in the reference channel for at least one of the sequential conversions; measuring a phase of each of the converted first and second pilot tones in the reference channel for each sequential conversion; adjusting the measured phase of the IF signal as a function of frequency for one or more of the sequentially converted portions of the output signal spectrum segment using the measured phases of the converted first and second pilot tones to produce phase-adjusted measurements of the IF signal; and stitching together the phase-adjusted measurements of the IF signal to produce a measurement of the amplitude and phase of the output signal spectrum segment as a function of frequency; and ascertaining relative phase differences between the plurality of output signal spectrum segments using the measured phases of the converted comb teeth in the reference channel for each of the output signal spectrum segments and the known phase differences between the comb teeth in the comb signal.

In some versions of these embodiments, the controller is configured to change the LO frequency for each sequential conversion by an amount about equal to a difference between the frequencies of the first and second pilot tones.

In some versions of these embodiments, the controller is configured to change the frequency of the one of the first and second pilot tones which does change from the immediately preceding conversion by about twice the amount by which the controller changes the frequency of the LO signal.

In some versions of these embodiments, the system is configured to adjust the measured phase of the IF signal as a function of frequency for one or more of the sequentially converted portions of the output signal spectrum using the measured phases of the converted first and second pilot tones by: for at least a current one of the sequential conversions, determining a phase adjustment to be applied to the measured phase of the IF signal as a function of frequency as a difference between: (1) the phase of the one of the first and second pilot tones which does change from the immediately preceding conversion, as measured for the current sequential conversion, and (2) the phase of the one of the first and second pilot tones which does change from the immediately preceding conversion, as measured for an immediately preceding sequential conversion; and applying the determined phase adjustment to the measured phase of the IF signal as a function of frequency for the current sequential conversion.

In some versions of these embodiments, the controller is configured to control the system to execute a procedure comprising: for each of the output signal spectrum segments: sequentially converting portions of the output signal spectrum segment down to the intermediate frequency (IF) signal in the first IF channel by mixing the output signal with the local oscillator (LO) signal, wherein a frequency of the LO signal is changed for each sequential conversion, and measuring an amplitude and phase of the IF signal as a function of frequency for each of the sequentially converted portions of the output signal spectrum using the first measurement device, wherein for at least one of the sequential conversions, mixing the reference signal with the LO signal produces at least one converted comb tooth in the reference channel; measuring a phase of the converted comb tooth in the reference channel for at least one of the sequential conversions; during at least some of the sequential conversions, measuring a first phase of the converted pilot tone with the converted pilot tone at a first frequency in the reference channel prior to changing the frequency of the LO signal, measuring a second phase of the converted pilot tone with the converted pilot tone at a second frequency in the reference channel subsequent to changing the frequency of the LO signal, where the frequency of the pilot tone is maintained to be substantially the same in measuring the first phase of the converted pilot tone as in measuring the second phase of the converted pilot tone, and after measuring the first and second phases of the converted pilot tone, and before changing the frequency of the LO signal again, changing the frequency of the pilot tone such that the converted pilot tone is at the first frequency in the reference channel; adjusting the measured phase of the IF signal as a function of frequency for one or more of the sequentially converted portions of the output signal spectrum segment using the measured first and second phases of the pilot tone to produce phase-adjusted measurements of the IF signal; and stitching together the phase-adjusted measurements of the IF signal to produce a measurement of the amplitude and phase of the output signal across the output signal spectrum segment as a function of frequency; and ascertaining relative phase differences between the plurality of output signal spectrum segments using the measured phases of the converted comb teeth in the reference channel for each of the output signal spectrum segments and the known phase differences between the comb teeth in the comb signal.

According to still another aspect of the invention, a method comprises: receiving from a device under test an output signal having an output signal spectrum which includes at least two output signal spectrum segments which are separated and spaced apart from each other in frequency; providing a local oscillator signal having an LO frequency; providing a comb signal having a plurality of comb teeth having known phase differences therebetween; providing a reference signal including the comb signal and at least a first pilot tone; mixing the output signal with the LO signal to produce a first intermediate frequency (IF) signal; mixing the reference signal with the LO signal to produce a converted reference signal included a converted first pilot tone in a reference channel; measuring an amplitude and phase of the IF signal with a first measurement device having a first measurement bandwidth which for any fixed frequency of the LO signal is less than the bandwidth of at least one of the output signal spectrum segments; measuring an amplitude and phase of the converted reference signal with a reference measurement device having a second measurement bandwidth which for any fixed frequency of the LO signal is less than the bandwidth of at least one of the output signal spectrum segments; and tuning the LO signal and the first pilot tone to measure the amplitude and phase of the output signal spectrum as a function of frequency including relative phases of the at least two output signal spectrum segments which are separated and spaced apart from each other in frequency, including using various ones of the comb teeth to determine a relative phase of the output signal spectrum between the at least two output signal spectrum segments.

In some embodiments, the reference signal further includes a second pilot tone, wherein the converted reference signal includes a converted second pilot tone, and wherein the method includes tuning the LO signal and the first and second pilot tones to measure the amplitude and phase of the output signal spectrum as a function of frequency.

In some versions of these embodiments, tuning the LO signal and the first and second pilot tones to measure the amplitude and phase of the output signal spectrum as a function of frequency including relative phases of the at least two output signal spectrum segments which are separated and spaced apart from each other in frequency includes: tuning the LO signal and the first and second pilot tones to measure the amplitude and phase of a first one of the output signal spectrum segments as a function of frequency, and to measure a phase of a first one of the comb teeth; tuning the LO signal and the first and second pilot tones to measure the amplitude and phase of a second one of the output signal spectrum segments as a function of frequency, and to measure a phase of a second one of the comb teeth; and using the measured phases of the first and second comb teeth to ascertain a relative phase between the first one of the output signal spectrum segments and the second one of the output signal spectrum segments.

In some versions of these embodiments, tuning the LO signal and the first and second pilot tones to measure the amplitude and phase of a first one of the output signal spectrum segments as a function of frequency includes using the first and second pilot tones to determine phase relationships between portions of the first output signal spectrum segment which are measured sequentially by tuning the LO signal to different frequencies.

In some embodiments, the method further includes for each of the output signal spectrum segments: sequentially converting portions of the output signal spectrum segment down to the intermediate frequency (IF) signal in a first IF channel by mixing the output signal with the local oscillator (LO) signal, wherein a frequency of the LO signal is changed for each sequential conversion, and measuring an amplitude and phase of the first IF signal as a function of frequency for each of the sequentially converted portions of the output signal spectrum segment; during each sequential conversion, mixing the first and second pilot tones and the comb signal with the LO signal to produce converted first and second pilot tones, selecting frequencies of the first and second pilot tones such that for each sequential conversion the converted first and second pilot tones are spaced apart from each other within the reference channel, wherein for each sequential conversion a frequency of one of the first and second pilot tones does not change from an immediately preceding conversion, and a frequency of another one of the first and second pilot tones does change from the immediately preceding conversion, wherein the one of the first and second pilot tones which does not change alternates from sequential conversion to sequential conversion, and wherein for at least one of the sequential conversions, mixing the reference signal with the LO signal produces at least one converted comb tooth in the reference channel; measuring a phase of each of the converted first and second pilot tones in the reference channel for each sequential conversion; adjusting the measured phase of the first IF signal as a function of frequency for one or more of the sequentially converted portions of the output signal spectrum segment using the measured phases of the converted first and second pilot tones to produce phase-adjusted measurements of the IF signal; and stitching together the phase-adjusted measurements of the first IF signal to produce a measurement of the amplitude and phase of the output signal spectrum segment as a function of frequency.

In some versions of these embodiments, the method further comprises measuring a phase of the converted comb tooth in the reference channel for at least one of the sequential conversions, and using the measured phase of the converted comb tooth to the ascertain a relative phase between the first one of the output signal spectrum segments and the second one of the output signal spectrum segments.

In some embodiments, the method further comprises: for each of the output signal spectrum segments: sequentially converting portions of the output signal spectrum segment down to the intermediate frequency (IF) signal in the first IF channel by mixing the output signal with the local oscillator (LO) signal, wherein a frequency of the LO signal is changed for each sequential conversion, and measuring an amplitude and phase of the IF signal as a function of frequency for each of the sequentially converted portions of the output signal spectrum using the first measurement device, wherein for at least one of the sequential conversions, mixing the reference signal with the LO signal produces at least one converted comb tooth in the reference channel; measuring a phase of the converted comb tooth in the reference channel for at least one of the sequential conversions; during at least some of the sequential conversions, measuring a first phase of the converted pilot tone with the converted pilot tone at a first frequency in the reference channel prior to changing the frequency of the LO signal, measuring a second phase of the converted pilot tone with the converted pilot tone at a second frequency in the reference channel subsequent to changing the frequency of the LO signal, where the frequency of the pilot tone is maintained to be substantially the same in measuring the first phase of the converted pilot tone as in measuring the second phase of the converted pilot tone, and after measuring the first and second phases of the converted pilot tone, and before changing the frequency of the LO signal again, changing the frequency of the pilot tone such that the converted pilot tone is at the first frequency in the reference channel; adjusting the measured phase of the IF signal as a function of frequency for one or more of the sequentially converted portions of the output signal spectrum segment using the measured first and second phases of the pilot tone to produce phase-adjusted measurements of the IF signal to produce phase-adjusted measurements of the IF signal; and stitching together the phase-adjusted measurements of the IF signal to produce a measurement of the amplitude and phase of the output signal across the output signal spectrum segment as a function of frequency; and ascertaining relative phase differences between the plurality of output signal spectrum segments using the measured phases of the converted comb teeth in the reference channel for each of the output signal spectrum segments and the known phase differences between the comb teeth in the comb signal.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

FIGS. 4A, 4B, 4C, 4D, 4E illustrate an example embodiment of a process of performing multiple downconversions of overlapping portions of an input signal and output signal spectrum to measure the input and output signal with a measurement device having a limited bandwidth.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

As noted above, in some cases it is desired to be able to provide an accurate and complete measurement of one or more periodically modulated signals using a receiver whose bandwidth is less than the bandwidth of the periodically modulated signal. As an example, it may be desired to measure the error-vector-magnitude (EVM) of a power amplifier which is excited by a contiguously aggregated 5-carrier LTE-A signal having a bandwidth of 100 MHz using a receiver whose bandwidth $R_{BW}$ is only 40 MHz. Because of spectral regrowth, the total bandwidth of the output signal of the amplifier could easily exceed 300 MHz.

Figure 1:
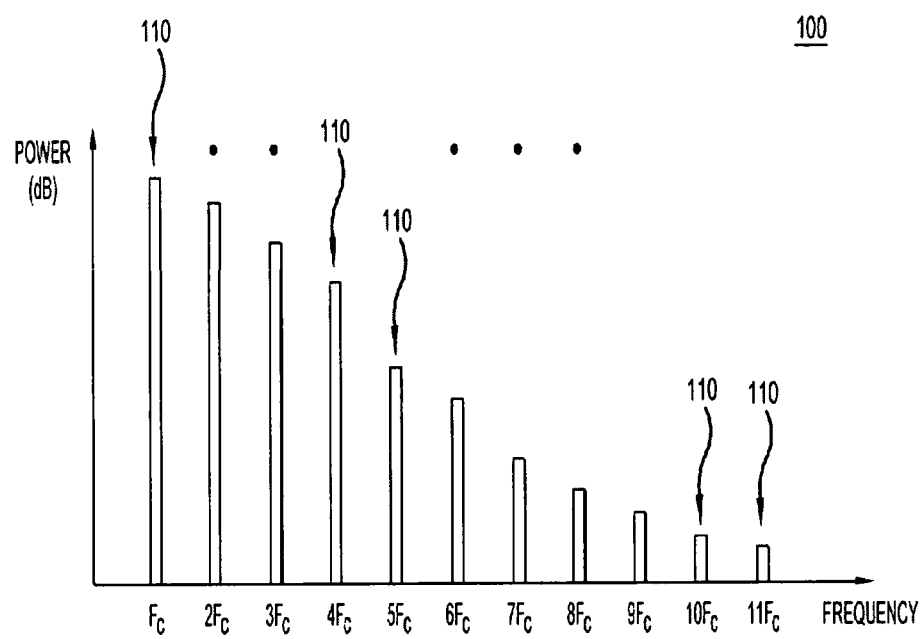
FIG. 1 illustrates the spectrum of a signal which contains energy around several integer multiples of a fundamental carrier frequency $f_C$.
Figure 2:
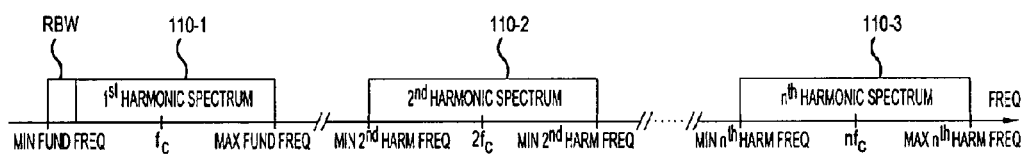
FIG. 2 illustrates several harmonics of output signal compared to an example measurement bandwidth which is less than the bandwidth of any of the harmonics.
Figure 3A:
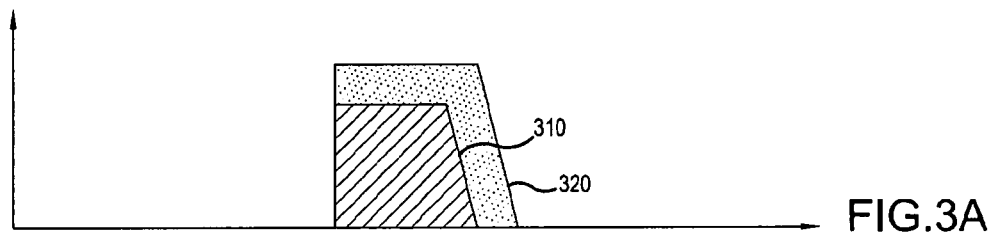
FIGS. 3A, 3B and 3C illustrate an example of downconverting and measuring a spectrum with a measurement device having a limited bandwidth.
Figure 3B:
Figure 3C:
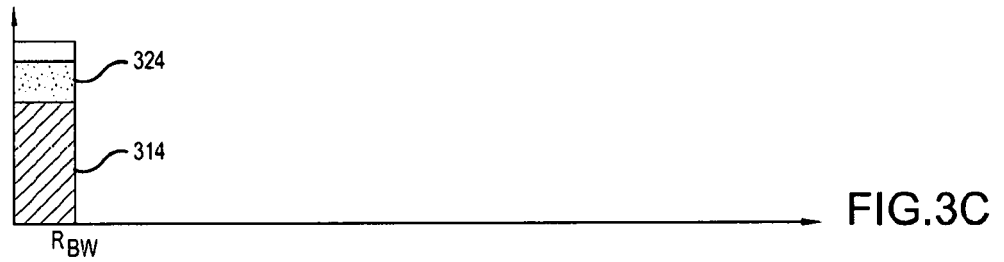

As illustrated above with respect to FIGS. 3A-3C, if the output signal was simply downconverted to baseband and then processed by the receiver, the part of the spectrum of the signal which extends beyond the receiver's bandwidth of 40 MHz would be filtered out, and so the signal would not be measured or characterized correctly.

Furthermore, if it is desired to measure multiple harmonics of the output signal, the required receiver bandwidth would be extremely large even in the case of a signal where the signal bandwidth around the fundamental frequency is not so great.

One technique to overcome this problem is spectral stitching. Spectral stitching involves performing multiple, separate, downconversions of overlapping portions of the signal's spectrum using different downconversion mixing frequencies, and then stitching together the measurements of all of the overlapping portions in order to produce an overall measurement of the entire spectrum of the signal. The bandwidth of each of the portions is less than or equal to the bandwidth of the measurement receiver.

For example, if the bandwidth, $S_{BW}$, of one harmonic of a signal's spectrum is 100 MHz, and the bandwidth, $R_{BW}$, of the measurement receiver is 30 MHz, then at least four separate downconversions are required for measuring at least four different portions of one harmonic of the signal spectrum in order to reconstruct the entire spectrum for the one harmonic. These four measurements can then be "spectrally stitched" together to produce a measurement of the entire 100 MHz bandwidth of the one harmonic of the signal spectrum. In general, the number, N, of measurements of separate downconverted portions of the signal spectrum which must be performed to capture one harmonic is:

$$N = \left\lceil \frac{S_{BW}}{R_{BW} - \Delta} \right\rceil, \tag{1}$$

where ⌈ ⌉ is the ceiling function, and wherein Δ is the minimum amount of overlap required for the adjacent spectral measurements. Of course, if it is desired to capture several harmonics of the output signal, then the number of measurements of separate downconverted portions of the signal spectrum which must be performed in order to stitch together the entire spectrum can increase dramatically, depending for example on the ratio of the signal's fundamental frequency and the receiver bandwidth, as will be discussed below.

As an example, FIGS. 4A-4E illustrate an example embodiment of a process of performing multiple, separate, downconversions of overlapping portions of example frequency spectrum 320 of one harmonic of an output signal with a measurement device having a limited bandwidth, that is a bandwidth which is less than the bandwidth of one harmonic of the signal to be measured. In particular, FIGS. 4A-4E illustrate an example embodiment of a process of performing multiple, separate (sequential), downconversions of overlapping portions of frequency spectrum 320 for one harmonic of an output signal of a device under test (DUT) (e.g., an amplifier) in response to a periodically modulated input signal, as discussed above with respect to FIGS. 3A-C.

FIG. 4A illustrates the frequency spectrum example frequency spectrum 322 of one harmonic of the output signal of the DUT downconverted to baseband with a first mixing frequency (e.g., LO1), as was shown above in FIG. 3B.

FIG. 4A further illustrates how the downconverted frequency spectrum 322 of the one harmonic of the output signal of the DUT can be divided into four overlapping portions or frequency ranges: 402, 404, 406 and 408, which each include an overlap region and which together span the frequency spectrum of the output signal. The overlap regions include: a first overlap region 403 for frequency ranges 402 and 404; a second overlap region 405 for frequency ranges 404 and 406; and a third overlap region 407 for frequency ranges 406 and 408.

As described above with respect to FIG. 3C above, when the downconverted frequency spectrum 322 of one harmonic of the output signal of the DUT is provided to a receiver with a limited bandwidth $R_{BW}$, then only portion 324 of downconverted frequency spectrum 322 of one harmonic of the output signal of the DUT, in frequency range 402, is measured by the receiver.

However, as illustrated in FIGS. 4B-4E, by repeating the downconversion process with different mixing frequencies, LO2, LO3 and LO4, portions of the downconverted frequency spectrum 322 in each of the frequency ranges 404, 406 and 408 may be measured separately, and then all of the measured portions may be stitched together as explained above to reproduce one harmonic of the original output signal frequency spectrum 320.

In particular, FIG. 4B illustrates the frequency spectrum 320 of one harmonic of the output signal of the DUT downconverted to baseband with a second mixing frequency (e.g., LO2), where here:

$$|LO2-LO1|=R_{BW}-\Delta \tag{2}$$

FIG. 4C then shows a portion 424 of the downconverted frequency spectrum of one harmonic of the output signal of the DUT which is actually able to be measured and characterized by the receiver with the limited bandwidth $R_{BW}$.

Similarly, FIG. 4D shows a portion 426 of the downconverted frequency spectrum of one harmonic of the output signal of the DUT which is actually able to be measured and characterized by the receiver with the limited bandwidth $R_{BW}$ when the frequency spectrum 320 of one harmonic of the output signal of the DUT is downconverted to baseband with a third mixing frequency (e.g., LO3), where here:

$$|LO3-LO2|=R_{BW}-\Delta \tag{3}$$

Finally, FIG. 4E shows a portion 428 of the downconverted frequency spectrum of the output signal of the DUT which is actually able to be measured and characterized by the receiver with the limited bandwidth $R_{BW}$ when the frequency spectrum 320 of the output signal of the DUT is downconverted to baseband with a fourth mixing frequency (e.g., LO4), where here:

$$|LO4-LO3|=R_{BW}-\Delta \tag{4}$$

As explained above, the frequency spectrum 320 of one harmonic of the output signal of the DUT can be reconstructed by spectrally stitching together the measurements of the overlapping portions 324, 424, 426 and 428 from the overlapping frequency ranges 402, 404, 406 and 408.

However, in general there will be unknown phase shifts between the mixing frequencies LO1, LO2, LO3 and LO4 used for the four separate downconversions. In that case, although it is possible to reconstruct the amplitude of the output signal of the DUT as a function of frequency by stitching together the amplitude measurements of the four portions 324, 424, 426 and 428, reconstructing the phase of the output signal of the DUT as a function of frequency is not possible due to the above-mentioned unknown phase shifts being introduced into the measured phases of the four overlapping portions 324, 424, 426 and 428. This prevents the measurement of phase-sensitive characteristics such as error-vector-magnitude (EVM).

This problem is further complicated when it is desired to measure two, three, or more harmonics of the output signal.

In particular, if the fundamental carrier frequency is 1.8 GHz and the bandwidth of each harmonic is 300 MHz, and if, for example, the stitching technique explained with respect to FIGS. 4A-4E above is employed to measure the output signal up to and including the third harmonic with a receiver having a measurement bandwidth of 40 MHz, one would need to acquire overlapping portions of the output signal spectrum over a total of 98 overlapping frequency ranges and then stitch the overlapping portions all together to reproduce the output signal. This could be quite time consuming and complicated.

However in the example above if, instead, one could measure only the spectral regions where there is actually signal energy, (i.e., around the harmonics) and stitch those measurements together, then one would need only to acquire overlapping portions of the output signal spectrum over a total of 24 overlapping frequency ranges, which a reduction by more than a factor of 4.

Accordingly, it would be desirable to provide a system and method of spectral stitching which can further correct for unknown phase shifts between the mixing (LO) frequencies used for various separate downconversions of overlapping portions of the spectrum in a spectral stitching process, and to correct for unknown phase shifts between measurements of multiple noncontiguous output signal spectrum segments.

In the description to follow, it is convenient to divide the arbitrary and unknown phase shifts into two distinct categories. The first type of unknown phase shift will be referred to as "type 1 phase shifts." Such type 1 phase shifts occur when one measures a portion of the spectrum of a single harmonic of a signal, and then tunes or shifts the frequency of the LO to acquire a neighboring portion of the spectrum of the same harmonic, as described above with respect to FIGS. 4A-4E. In such cases, the frequency by which the LO is tuned or shifted is always equal to or less than the receiver IF bandwidth. One may eliminate type 1 phase shifts by use of pilot tones, as will be described below. The second type of unknown phase shift will be referred to as "type 2 phase shifts." Such type 2 phase shifts occur when one has completed the measurement of the spectrum of a particular harmonic of the signal, and then tunes or shifts the frequency of the LO to acquire the spectrum of another one of the harmonics. In such cases, the frequency by which the LO is offset cannot be guaranteed to be less than the effective receiver IF bandwidth. In fact, the required LO frequency offset is typically significantly larger than the receiver IF bandwidth, and type 2 phase shifts can therefore not be eliminated by the use of pilot tones.

Accordingly, systems and methods will be described below which may eliminate both types of unknown phase shifts by combining in a reference receiver channel the measurement of pilot tones for elimination of type 1 phase shifts, and the measurement of comb teeth of a broadband repetitive pulse generator (e.g., a harmonic phase reference) for elimination of type 2 phase shifts.

Figure 5:
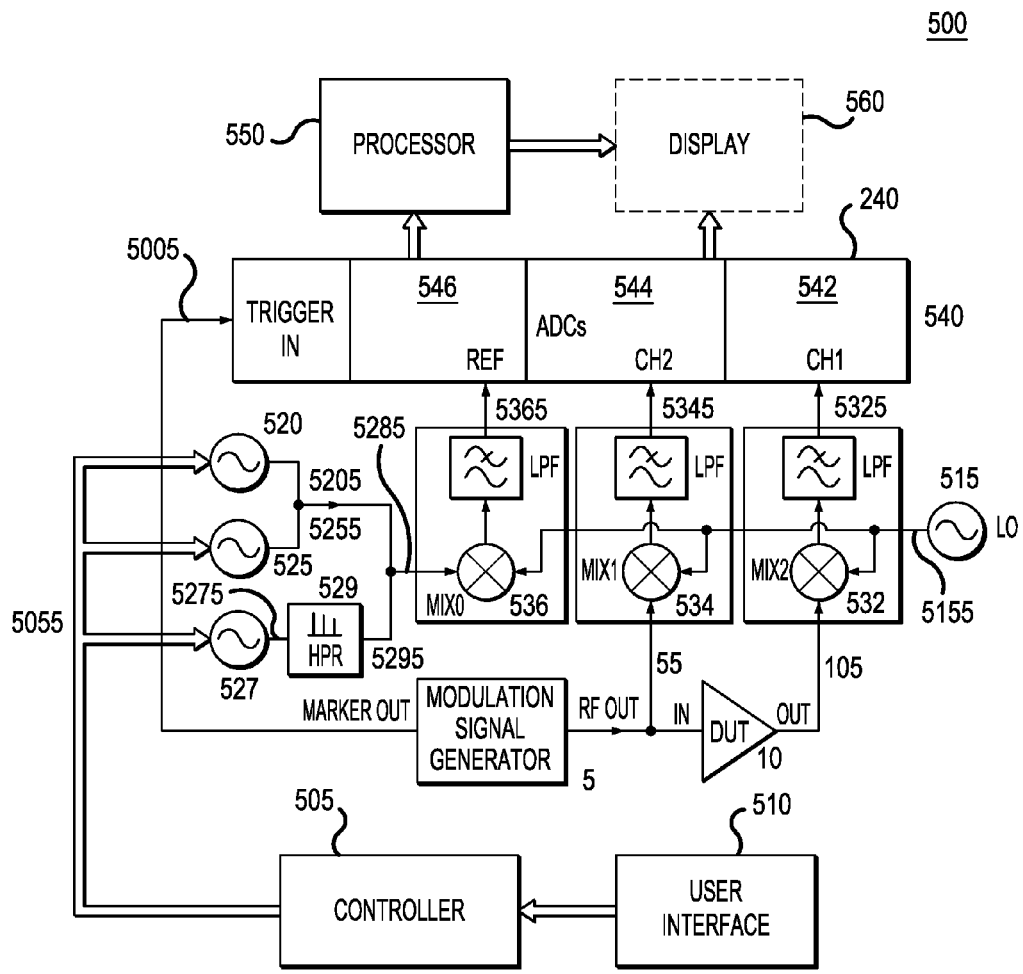
FIG. 5 illustrates an example embodiment of a measurement system for measuring a spectrum of a signal from a device under test which includes multiple noncontiguous output signal spectrum segments, where the bandwidth of a measurement device of the measurement system is less than the bandwidth of the signal to be measured.

FIG. 5 illustrates an example embodiment of a measurement system 500 for measuring at least one characteristic, e.g., a spectrum, of a signal from a device under test which includes multiple noncontiguous output signal spectrum segments (e.g., harmonics), where the bandwidth of a measurement device of measurement system 500 is less than the bandwidth of the signal to be measured. Measurement system 500 includes: a controller 505; a user interface 510; a local oscillator 515; a first signal generator 520; a second signal generator 525; a third signal generator 527, a comb signal generator (e.g., a harmonic phase reference (HPR)) 529; a first frequency converter 532; a second frequency converter 534; a third (reference) frequency converter 536; a measurement instrument 540; a processor 550; and a display 560.

In particular, as will be explained in greater detail below, system 500 includes Controller 505 may include one or more processing elements (e.g., CPUs), memory (including volatile and/or nonvolatile memory), and a communication interface for communicating with local oscillator 515, first signal generator 520, second signal generator 525 and third signal generator 527. The memory may store therein instructions for causing the processor(s) to control operations of system 500, for example to perform various operations and methods described herein such as with respect to FIGS. 6-8 below. In some embodiments, controller 505 may communicate commands to local oscillator 515, first signal generator 520, second signal generator 525, and third signal generator 527 to set or adjust their output frequencies, amplitudes, etc. via a communication connection or bus 5055. Such communications may employ any of a variety of standard protocols such as General Purpose Interface Bus (GPIB)/IEEE-488, LAN eXtensions for Instrumentation (LXI), VME eXtensions for Instrumentation (VXI), PCI eXtensions for Instrumentation (PXI), universal serial bus (USB), FireWire, Ethernet, TCP/IP, etc.

In some embodiments, user interface 510 allows a user to program and/or set operating parameters for controller 505. For example, where controller 505 executes an algorithm which controls the output frequencies of local oscillator 515, first signal generator 520, second signal generator 525, and third signal generator 527. In some embodiments a user may enter the frequencies via user interface 510. User interface 510 may include any combination of well-known input devices and output devices, such as keyboard, mouse, trackball, keypad, pushbuttons, one or more display devices (which may include LCD readouts), touchscreen, etc.

In some embodiments, controller 505 and user interface 510 may be integrated into a single device, such as a computer, laptop, tablet, smartphone, etc.

Local oscillator 515, first signal generator 520, second signal generator 525, and third signal generator 527 may each comprise a programmable frequency generator generating a signal whose frequency is programmable, for example under control of controller 505 and/or via input controls integrated into the device.

Local oscillator 515 generates or produces a local oscillator (LO) signal 5155. First signal generator 520 generates or produces a first pilot tone 5205, and second signal generator 525 generates or produces a second pilot tone 5255.

Third signal generator 527 generates a comb generator reference signal 5275. Comb signal generator 529, also referred to as a broadband repetitive pulse generator, receives comb generator reference signal 5275 and in response thereto generates a comb signal 5295 having a plurality of comb teeth at harmonics of a fundamental frequency, which may be the frequency of comb generator reference signal 5275. In some embodiments, third signal generator 527 may be a fixed frequency generator and/or comb signal generator 529 may generate comb signal 5295 having the plurality of comb teeth at fixed frequencies. In some embodiments, third signal generator 527 may be internally included in comb signal generator 529. Beneficially, the relative phases of the comb teeth of comb signal 5295 output by comb signal generator 529 may be stored in memory accessible by processor 550.

Although not shown in FIG. 5, system 500 may include one or more signal combiners to combine first pilot tone 5205, and second pilot tone 5255, and comb signal 5295 to produce a combined reference signal 5285.

First frequency converter 532, second frequency converter 534, and third (reference) frequency converter 536 (also referred to as a reference frequency converter) each include a mixer and a low pass filter (LPF). Each of the mixers has two inputs, including a first input which receives LO signal 5155, and an output. The output of each mixer is connected to an input of the corresponding LPF, and the output of each LPF is at the output of the corresponding frequency converter. Beneficially, the bandwidths of the LPFs in first frequency converter 532, second frequency converter 534, and reference frequency converter 536 may all be the same, or approximately the same, as each other.

First frequency converter 532 is also configured, or connected, to receive an output signal 105 of device under test (DUT) 10 (e.g., an amplifier). More specifically, output signal 105 is provided to the second input of the mixer of first frequency converter 532 and the mixer is configured to mix output signal 105 with LO signal 5155 to produce an intermediate frequency (IF) signal, also referred to herein as first IF signal, in a first IF channel 5325 at the output of the mixer. The input of the LPF receives the first IF signal, and the output of the LPF outputs the first IF signal at the output of first frequency converter 532.

Second frequency converter 534 is configured, or connected, to receive a second signal 65 and to mix the second signal with LO signal 5155 to produce a second intermediate frequency (IF) signal in a second IF channel 5345 at the output of the LPF. In the illustrated embodiment, the second signal 65 is a periodically modulated input signal 55 provided to DUT 10 by periodic signal generator 5. However in other embodiments, second signal 65 may a reflected signal produced from the input of DUT 10, or a reflected signal produced from the output of DUT 10. In particular, the reflected output signal may be more interesting than the input signal when it is desired to measure multiple harmonics, since—as explained above—in most cases there is very little energy in the input signal outside of the fundamental frequency. More specifically, in the illustrated embodiment second signal 65 is provided to the second input of the mixer of second frequency converter 534 and the mixer is configured to mix second signal 65 with LO signal 5155 to produce the second IF signal in second IF channel 5345 at the output of the mixer. The input of the LPF receives the second IF signal, and the output of the LPF outputs the second IF signal at the output of second frequency converter 534.

Reference frequency converter 536 is configured, or connected, to receive reference signal 5285 including first pilot tone 5205, second pilot tone 5255 and comb signal 5295. More specifically, reference signal 5285 is provided to the second input of the mixer of reference frequency converter 536 and the mixer is configured to mix reference signal 5285 with LO signal 5155 to produce converted first and second pilot tones and at least one converted comb tooth in a third IF channel 5365 (also referred to as a reference channel) at the output of the mixer. The input of the LPF receives the converted first and second pilot tones and the at least one converted comb tooth, and the output of the LPF outputs the converted first and second pilot tones and the at least one converted comb tooth at the output of reference frequency converter 536.

Measurement instrument includes a first measurement device 542, a second measurement device 544, and a third measurement device 546 (also referred to as a reference measurement device).

First measurement device 542, second measurement device 544, and third measurement device 546 may each comprise a sampler, an analog-to-digital converter (ADC) and memory. In some embodiments, memory may be shared among first measurement device 542, second measurement device 544, and third measurement device 546. In particular first measurement device 542 is configured to sample and digitize first IF channel 5325 and produce a plurality of data samples at an operating frequency of the sampler and ADC. Second measurement device 544 is configured to sample and digitize second IF channel 5345 and produce a plurality of data samples at an operating frequency of the sampler and ADC. Third measurement device 546 is configured to sample and digitize third IF channel 5365 and produce a plurality of data samples at an operating frequency of the sampler and ADC. The data samples may be stored in memory for subsequent processing by measurement instrument 540 and/or processor 550. Beneficially, the operating frequencies of all of the samplers/ADCs, and the bandwidths of first measurement device 542, second measurement device 544, and third measurement device 546 may all be the same as each other. Beneficially, the bandwidths of the LPFs in first frequency converter 532, second frequency converter 534, and reference frequency converter 536 may be selected to match the operating bandwidths of the ADCs in first measurement device 542, second measurement device 544, and third measurement device 546. In some embodiments, first measurement device 542, second measurement device 544, and third measurement device 546 each may include a digital signal processor which is configured to perform a Fourier transform (e.g., a digital Fourier transform) on data samples output by the ADC.

Processor 550 may include one or more processing elements (e.g., CPUs) and memory, including volatile and/or nonvolatile memory, which may store instructions to be executed by the processing element(s). Processor 550 is configured to process the data samples from first measurement device 542, second measurement device 544, and third measurement device 546 to provide measurements of output signal 105 and the second signal 65 (e.g., input signal 55) provided to third measurement device 546. In some embodiments, processor 550 may include one or more digital signal processors configured to perform a Fourier transform (e.g., a digital Fourier transform) on data samples from each of the first measurement device 542, second measurement device 544, and third measurement device 546. In some embodiments, processor 550 may process the data samples from first measurement device 542 and second measurement device 544 to stitch together phase-adjusted measurements of the first IF signal in first IF channel 5325 to produce a measurement of the amplitude and phase of output signal 105 across a plurality of contiguous output signal spectrum segments as a function of frequency.

In some embodiments, processor 550 and controller 505 may be combined, and may share processing resources, including memory, one or more processors, and/or user interface 510.

Display 560 is configured to display waveforms generated by processor 550 from ADC data produced by measurement instrument 540. In some embodiments, display 560 may be combined with, or part of, user interface 510.

Operations of system 500 for measuring or characterizing one or more signals related to DUT 10, including two or more harmonics of the signal(s), will now be described.

Here it is assumed that the signal bandwidth $S_{BW}$ of one harmonic of output signal 105 is greater than the receiver bandwidth $R_{BW}$ of first measurement device 542, which may be limited by the maximum conversion rate of an ADC which is included in first measurement device 542. Furthermore, it is assumed here that the signal bandwidth $S_{BW}$ of second signal 65 is also greater than the receiver bandwidth $R_{BW}$ of second measurement device 544. It is further assumed that input signal 55 is a periodically modulated signal. It is also assumed that periodic signal generator 5, local oscillator 515, first signal generator 520, and second signal generator 525 are all frequency locked or synchronized to a common master reference frequency (e.g., 10 MHz), for example provided by a master reference frequency generator (not shown in FIG. 5) to which all of these components are connected. Additionally, it is assumed that the relative phases of the comb teeth of comb signal 5295 are known (e.g., via a calibration procedure) and stored in memory accessible by processor 550. Finally, it is assumed that any systematic phase dispersions in the IF channels are corrected for by system 500, for example by means of a system calibration procedure.

In operation, second signal 65 and output signal 105 are each converted to a corresponding IF signal at a lower frequency in a corresponding IF channel 5325/5365 by first and second frequency converters 532 and 534, respectively. In particular, first and second frequency converters 532 and 534 mix second signal 65 and output signal 105, respectively, with LO signal 5155, and then low pass filter the output of the mixers. The IF signals in first and second IF channels 5325 and 5345 are then sampled and digitized by a corresponding pair of ADCs in first and second measurement devices 542 and 544 to produce ADC data. Processor 550 converts the ADC data to frequency domain data by performing a digital Fourier transform (DFT) on the ADC data.

The ADCs in first and second measurement devices 542 and 544 are synchronized with each other, and are further synchronized to the start of the modulation period of periodically modulated input signal 55. One method to realize the synchronization is by using a "marker out" signal 5005 output by periodic signal generator 5 and provided to measurement instrument 540, which uses it as a trigger signal for the ADCs. Other methods can be used to realize the synchronization. Beneficially, each sample made by the samplers and ADCs may be synchronized to occur at a same point in the period of periodically modulated input signal 55 for each measurement of each portion (e.g., 402, 404, 406 and 408) of frequency spectrum 320 of one harmonic of output signal 105.

In order to measure the complete spectra of one harmonic of output signal 105, the spectrum of each signal is divided into two or more overlapping portions or frequency ranges (e.g., 402, 404, 406 and 408) which are each individually measured and then stitched together, as described above.

However it is a challenge, as described above, is to reconstruct the phase of output signal 105 across the bandwidth of one harmonic from the measured phase of each portion of the spectrum of the harmonic. Every one of these measurements of a different portion of the spectrum of output signal 105 will be made with a different LO frequency, and in general when the LO frequency is changed, an arbitrary and unknown phase shift occurs in LO signal 5155. When the phase measurements of the different portions are stitched together, these phase shifts produce errors in the phase measurement of the overall spectrum unless they are corrected. It should be noted that the same LO signal 5155 is used by both first and second frequency converters 532 and 534.

Furthermore, it is challenge to reconstruct the phase of output signal 105 for noncontiguous spectrum segments (e.g., from one harmonic to another harmonic).

System 500 addresses these challenges by measuring the phase shifts of LO signal 5155 when the LO frequency is changed from one measurement to the next through the use of third frequency converter (reference frequency converter) 536, third measurement device 546 (reference measurement device), first and second pilot tones 5205 and 5255 generated by first and second signal generators 520 and 525, and comb signal 5295. Here it is noted that the same LO signal 5155 which is used by first and second frequency converters 532 and 534 is also employed by reference frequency converter 536, so that any phase shift in LO signal 5155 which occurs when the LO frequency is changed will also be seen by reference frequency converter 536. When measuring any one harmonic of output signal 105 and/or second signal 65, system 500 (e.g., by means of processor 550): (1) adjusts the measured phase of the IF signal(s) in IF channels 5325/5345 as a function of frequency for one or more of the sequentially converted portions of the spectrum of the harmonic by applying to the measured phase a phase offset determined from measured phases of the converted first and second pilot tones 5205 and 5255 to account for the change of phase in LO signal 5155 from measurement of one portion (or frequency range) to measurement of a next portion (or frequency range), to thereby produce phase-adjusted measurements of the IF signal; and (2) stitches together the phase-adjusted measurements of the IF signal(s) to produce a measurement of the amplitude and phase across the spectrum of one harmonic of second signal 65, and/or the spectrum of one harmonic output signal 105, as a function of frequency. Additionally, when moving from measurements for one spectrum segment (e.g., one harmonic) of second signal 65 and/or output signal 105 to another non-contiguous spectrum segment (e.g., another harmonic) of second signal 65 and/or output signal 105, system 500 (e.g., by means of processor 550): (1) measures the amplitude and phase of a converted comb tooth in the reference channel for at least one of the sequential conversions for each of the spectrum segments, and (2) ascertains or determines relative phase differences between the output signal spectrum segments using the measured phases of the converted comb teeth in the reference channel for each of the output signal spectrum segments, and the known phase differences of the comb teeth in the comb signal.

A concrete example will now be provided to better illustrate various aspects of embodiments of the systems and methods disclosed herein. In this example, the spectra of M=3 noncontiguous spectrum segments (e.g., harmonics) of a signal are measured, and the frequency spectrum of each spectrum segment (e.g., harmonic) of the signal being measured is divided into N=3 portions which are measured separately or sequentially, and stitched together to produce an overall spectrum of the signal which is being measured. However it should be understood that in general M and N each may be any integer greater than 1.

Figure 6:
FIG. 6 illustrates an example embodiment of a method of measuring a spectrum of an output signal from a device under test which includes multiple noncontiguous output signal spectrum segments, where the bandwidth of the measurement device is less than the bandwidth of the signal to be measured, by stitching together measurements of overlapping portions of the output signal spectrum segments.

FIG. 6 illustrates an example embodiment of a method 600 of measuring a spectrum of an output signal from a device under test which includes multiple noncontiguous output signal spectrum segments, where the bandwidth of the measurement device is less than the bandwidth of the signal to be measured, by stitching together measurements of overlapping portions of the output signal spectrum segments. In particular, method 600 illustrates measuring a first harmonic 110-1, a second harmonic 110-2 and a third harmonic 110-3 of the output signal (e.g., output signal 105 DUT 10). Operations 610, 620, and 630 pertain to measuring first harmonic 110-1; operations 640, 650, and 660 pertain to measuring second harmonic 110-2; and operations 670, 680, and 690 pertain to measuring third harmonic 110-3. Although FIG. 6 and the description to follow pertain only to measurement of the noncontiguous output signal spectrum segments, it should be understood that the same procedure may be applied to measure noncontiguous spectrum segments of a second signal (e.g., second signal 65, which may be a reflected output signal from the output port of DUT 10) at the same time as measuring the noncontiguous output signal spectrum segments.

In an operation 610, when measuring a first portion of the spectrum of first harmonic 110-1, the LO frequency of LO signal 5115 is set (e.g., by controller 505) to Lo1. The frequency of first pilot tone 5205 is set (e.g., by controller 505) so that when first pilot tone 5205 is mixed with LO signal 5115, a downconverted first pilot tone P1 appears at a frequency F1 in a lower part of reference channel 5365 (which mirrors first IF channel 5325 and second IF channel 5345), in particular a frequency range which does not overlap with a frequency range for a second portion of the spectrum of first harmonic 110-1 to be measured next. Meanwhile, the frequency of second pilot tone 5255 is set (e.g., by controller 505) so that when second pilot tone 5205 is mixed with LO signal 5115, a downconverted second pilot tone P2 appears at a frequency F2 in an upper part of reference channel 5365, in particular a frequency range which overlaps with the second portion of the spectrum of first harmonic 110-1 to be measured next in operation 620. The difference between the frequencies F2 and F1 is denoted as DF. Measurement instrument 540 measures: the first IF signal in first IF channel 5325 representing the downconverted first portion 402-1 of first harmonic 110-1 of output signal 105 and the downconverted first and second pilot tones P1 and P2 of reference signal 5285 in reference channel 5365. Measurement instrument 540 or processor 550 applies a phase correction or fixed phase shift to the measured spectrum of downconverted first portion 402-1 of the first spectrum segment (e.g., first harmonic 110-1) of output signal 105, where the fixed phase shift equals the negative of the measured phase ($PH_1(1)$) of downconverted first pilot tone P1. The phase-adjusted spectrum will be the first portion of the reconstructed stitched spectrum. Meanwhile, the phase-adjusted value of the measured phase ($PH_1(2)$) of downconverted second pilot tone P2, may be stored in memory as T1. Here $T1=PH_1(2)-PH_1(1)$. Note that this first phase shift equal to the negative of the measured phase ($PH_1(1)$) is not necessary and may be omitted in some embodiments. It is included only in the described embodiment to reflect a more general implementation. The phase-adjusted data for the first portion of the spectrum of first harmonic 110-1 of output signal 105 may be stored in memory.

Next, in an operation 620, the LO frequency of LO signal 5115 is set (e.g., by controller 505) to LO2=LO1+DF. The frequency of first pilot tone 5205 is increased (e.g., by controller 505) by 2*DF such that the downconverted first pilot tone P1 is at a frequency F1+2*DF which is now in the upper part of reference channel 5365 (which mirrors first IF channel 5325), in particular a frequency range of a downconverted second portion 404-1 of the spectrum of first harmonic 110-1 which overlaps with a third portion of the spectrum to be measured next in operation 630. Meanwhile, the frequency of second pilot tone 5255 (and thus of the downconverted second pilot tone P2) is maintained to be substantially the same as in the immediately preceding conversion or operation 610. Here, when we say that the frequency of a pilot tone is maintained to be substantially the same as in an immediately preceding conversion, this indicates that the frequency remains the same except for any minor frequency drift within the tolerances of second signal generator 525. For example, controller 505 may not issue any command in operation 620 to second signal generator 525 to change the frequency of second pilot tone 5255, and accordingly second signal generator 525 continues to produce a downconverted second pilot tone P2 whose frequency F2 is not changed with respect to immediately preceding operation 610. As explained below, by maintaining the frequency of downconverted second pilot tone P2 unchanged between operations 610 and 620, a reference point can be established for factoring out an effect caused by a change in the phase of LO signal 5155 which occurs in general between operations 610 and 620 due to the output frequency of local oscillator 515 being changed or reprogrammed, for example by controller 505. Measurement instrument 540 measures: the first IF signal in first IF channel 5325 representing downconverted second portion 404-1 of output signal 105, and the downconverted first and second pilot tones P1 and P2 of reference signal 5285 in reference channel 5365. Measurement instrument 540 or processor 550 applies a fixed phase shift to the measured spectrum of downconverted second portion 404-1 of the first spectrum segment (e.g., first harmonic 110-1) of output signal 105, where the fixed phase shift equals T1 minus the measured phase ($PH_2(2)$) of downconverted second pilot tone P2. The phase-adjusted spectrum will be the second portion of the reconstructed stitched spectrum. Meanwhile, the phase-adjusted value of the measured phase ($PH_2(1)$) of downconverted first pilot tone P1 may be stored in memory as T2. Here $T2=PH_2(1)-PH_2(2)+PH_1(2)-PH_1(1)$. The phase-adjusted data for the second portion of the spectrum of first harmonic 110-1 of output signal 105 may be stored in memory.

Next, in an operation 630, the LO frequency of LO signal 5115 is set (e.g., by controller 505) to LO3=LO1+2*DF. The frequency of second pilot tone 5255 is increased (e.g., by controller 505) by 2*DF to a frequency F2+2DF such that downconverted second pilot tone P2 appears in the upper part of reference channel 5365 (which mirrors first IF channel 5325). Meanwhile, the frequency of first pilot tone 5205 is maintained at substantially the same frequency as in the preceding operation 620 such that the downconverted first pilot tone P1 remains at the same frequency (F1+2*DF) as in preceding operation 620. Measurement instrument 540 measures: the first IF signal in first IF channel 5325 representing downconverted third portion 406-1 of output signal 105 and the downconverted first and second pilot tones P1 and P2 of reference signal 5285 in reference channel 5365. Measurement instrument 540 or processor 550 applies a fixed phase shift to the measured spectrum of downconverted third portion 406-1 of the first spectrum segment (e.g., first harmonic 110-1) of output signal 105, where the fixed phase shift equals T2 minus the measured phase ($PH_3(1)$) of downconverted first pilot tone P1. The phase-adjusted spectrum will be the third portion of the reconstructed stitched spectrum. Meanwhile, the phase-adjusted value of the measured phase ($PH_3(2)$) of downconverted second pilot tone P2 may be stored in memory as T3. Here $T3=PH_3(2)-PH_3(1)+PH_2(1)-PH_2(2)+PH_1(2)-PH_1(1)$. The phase-adjusted data for the third portion of the spectrum of first harmonic 110-1 of output signal 105 may be stored in memory.

In general, this procedure is repeated until all N portions of the spectrum of first harmonic 110-1 of output signal 105 is measured. The phase-adjusted data for all N portions of the spectrum of first harmonic 110-1 of output signal 105 are stitched together to produce the spectrum of first harmonic 110-1 of output signal 105.

In at least one of the preceding operations 610, 620 or 630, measurement instrument 540 measures the amplitude and phase of a comb tooth HPR1 of reference signal 5285 in reference channel 5365. Although for simplicity of explanation FIG. 6 illustrates a situation where a single comb tooth HPR1 is provided at the fundamental frequency $f_C$ of the signal (e.g., output signal 105) which is being measured, in general the comb tooth may be located anywhere within the spectrum of first harmonic 110-1. Furthermore, more than one comb tooth may be provided within the spectrum of first harmonic 110-1, in which case the amplitude and phase of one or more of the comb teeth are measured in at least one of the operations 610, 620 or 630. Here it is assumed that the relative phases of the comb teeth of comb signal 5295 are known (e.g., via a calibration procedure) and stored in memory accessible by processor 550.

Next, in an operation 640, the LO frequency of LO signal 5115 is set (e.g., by controller 505) to LO4=LO1+fc, the fundamental frequency of the output signal. The frequency of first pilot tone 5205 is increased (e.g., by controller 505)

by ($f_C$−2*DF) to produce a downconverted first pilot tone P1 at a frequency (F1+$f_C$) which is now back in the lower part of reference channel 5365. Meanwhile, the frequency of second pilot tone 5255 is increased (e.g., by controller 505) by ($f_C$−2*DF) to produce a downconverted second pilot tone P2 at a frequency (F1+$f_C$+DF) which is now back in the upper part of reference channel 5365. From here, the remaining details for measuring second harmonic 110-2 are the same as operations 610, 620 and 630 described above, and so will not be repeated. As before, in at least one of the operations 640, 650 or 660, measurement instrument 540 measures the amplitude and phase of a comb tooth HPR2 of reference signal 5285 in reference channel 5365.

Operations 670, 680, and 690 for measuring third harmonic 110-3 proceed in a similar manner, as illustrated in FIG. 6, and in at one of these operations measurement instrument 540 measures the amplitude and phase of a comb tooth HPR3 of reference signal 5285 in reference channel 5365.

Using the measurement data obtained in operations 610-690, system 500 ascertains the relative phase differences between the output signal spectrum segments (e.g., first harmonic 110-1, second harmonic 110-2 and third harmonic 110-3) using the measured phases of the converted comb teeth HPR1, HPR2, and HPR3 in reference channel 5365 for each of the output signal spectrum segments and the known phase differences between comb teeth HPR1, HPR2, and HPR3 in the comb signal 5295.

Figure 7A:
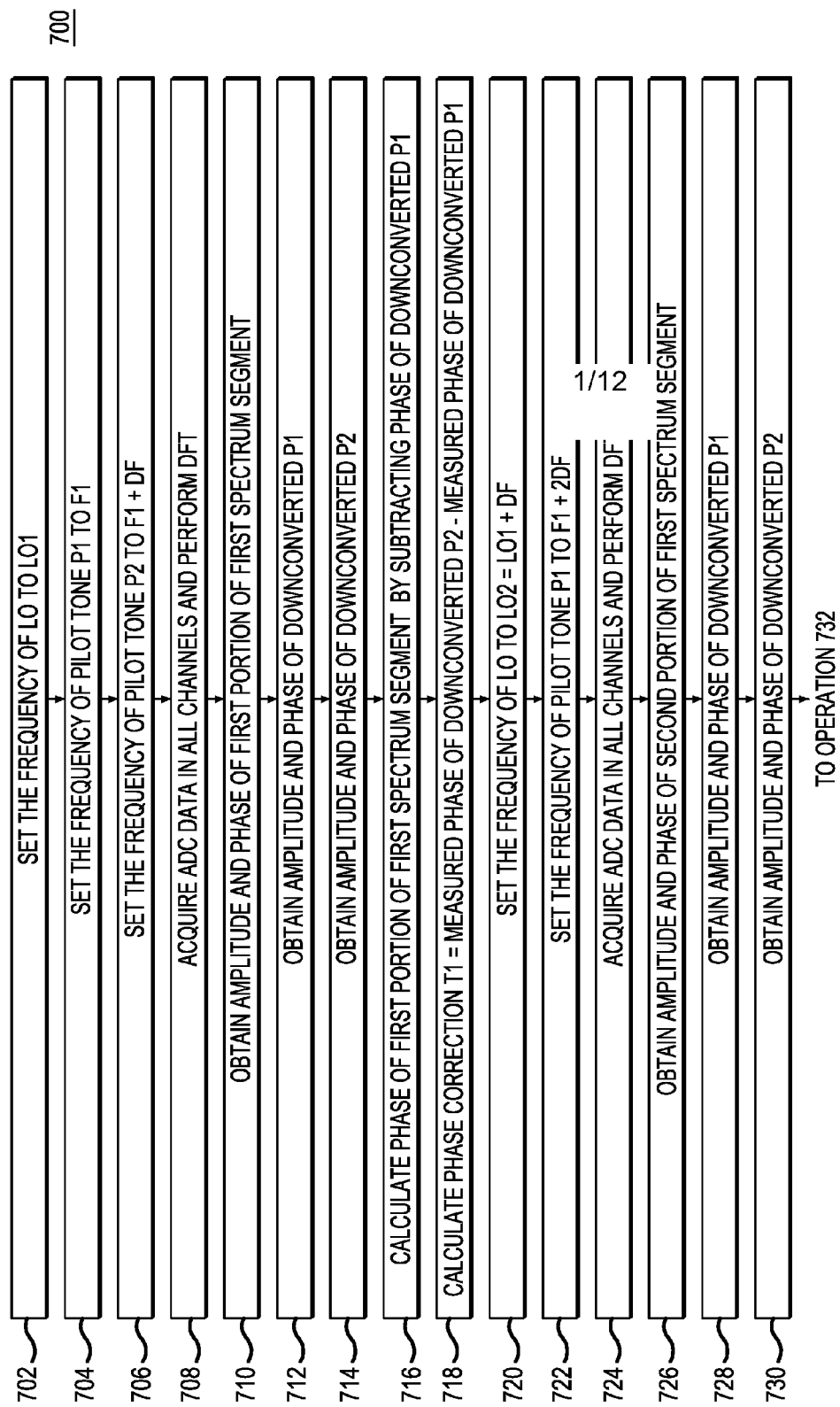
FIGS. 7A and 7B show a flowchart of a method of measuring a spectrum of a signal from a device under test which includes multiple noncontiguous output signal spectrum segments, where the bandwidth of the measurement device is less than the bandwidth of the signal to be measured, by stitching together measurements of overlapping portions of the output signal spectrum segments.
Figure 7B:
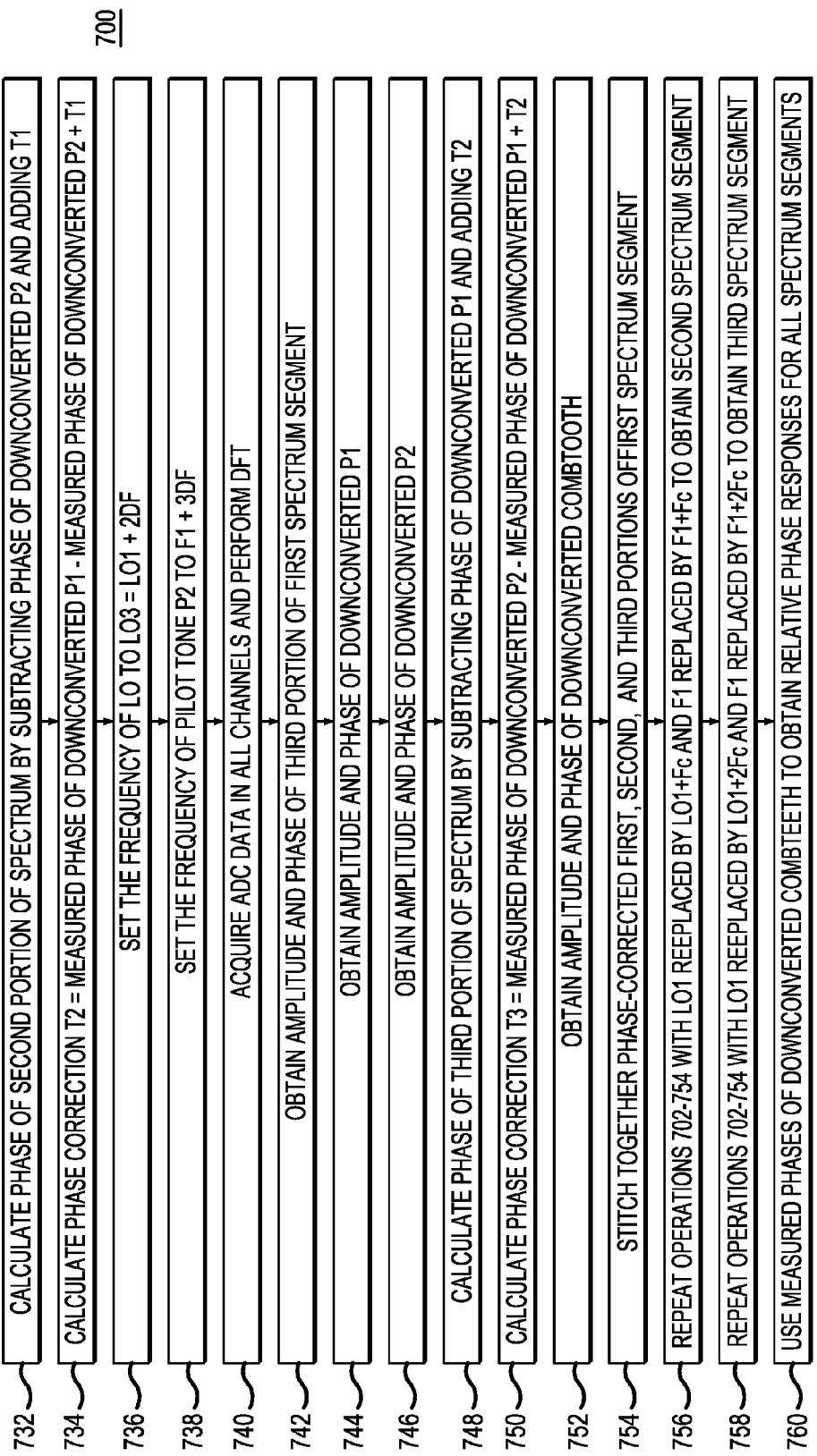

FIGS. 7A and 7B show a flowchart of a method 700 of measuring a spectrum of a signal from a device under test which includes multiple noncontiguous output signal spectrum segments, where the bandwidth of the measurement device is less than the bandwidth of the signal to be measured, by stitching together measurements of overlapping portions of the output signal spectrum segments. In particular, the method 700 comprises an embodiment of detailed steps for the method 600 shown in FIG. 6.

An operation 702 includes setting the frequency of LO signal 5155 to L01. In some embodiments, this operation may be performed by controller 505 sending a command to local oscillator 515 via communication bus 5055.

An operation 704 includes setting the frequency of pilot tone P1 to F1. In some embodiments, this operation may be performed by controller 505 sending a command to first signal generator 520 via communication bus 5055.

An operation 706 includes setting the frequency of pilot tone P2 to F1+DF. In some embodiments, this operation may be performed by controller 505 sending a command to second signal generator 525 via communication bus 5055.

An operation 708 includes acquiring ADC data for all IF channels, and performing a digital Fourier transform (DFT) on the ADC data. For example, the ADC data for output signal 105 may be obtained by first measurement device 542 sampling the first IF signal in first IF channel 5325 at a sample rate, and digitizing the sample. In various embodiments, measurement instrument 540 or processor 550 may perform the digital Fourier transform on the digitized samples of the first IF signal (also referred to as digitized IF samples).

An operation 710 includes obtaining the amplitude and phase of the first portion of the spectrum of first harmonic 110-1 for each signal being measured. In various embodiments, operation 710 may be performed by measurement instrument 540 and/or processor 550.

An operation 712 includes obtaining the amplitude and phase of the downconverted pilot tone P1. In some embodiments, operation 712 may be performed by measurement instrument 540 and/or processor 550.

An operation 714 includes obtaining the amplitude and phase of the downconverted pilot tone P2. In some embodiments, operation 714 may be performed by measurement instrument 540 and/or processor 550.

An operation 716 includes calculating the adjusted or corrected phase of the first portion of the spectrum of first harmonic 110-1 of each signal which is being measured, by subtracting the phase of the downconverted pilot tone P1 from the measured phase of the first portion of the spectrum of first harmonic 110-1 to produce a phase-adjusted measurement of the first portion of the spectrum of first harmonic 110-1 of each signal which is being measured. In some embodiments, operation 716 may be performed by measurement instrument 540 and/or processor 550.

An operation 718 includes calculating a phase correction T1=measured phase of the downconverted pilot tone P2−measured phase of the downconverted pilot tone P1. In some embodiments, operation 718 may be performed by measurement instrument 540 and/or processor 550.

An operation 720 includes setting the frequency of LO signal 5155 to LO2=LO1+DF. In some embodiments, this operation may be performed by controller 505 sending a command to local oscillator 515 via communication bus 5055.

An operation 722 includes setting the frequency of pilot tone P1 to F1+2DF. In some embodiments, this operation may be performed by controller 505 sending a command to first signal generator 520 via communication bus 5055.

An operation 724 includes acquiring ADC data for all IF channels, and performing a discrete Fourier transform. For example, the ADC data for output signal 105 may be obtained by first measurement device 542 sampling the first IF signal in first IF channel 5325 at a sample rate, and digitizing the sample. In some embodiments, measurement instrument 540 or processor 550 performs a digital Fourier transform on the digitized samples of the first IF signal.

An operation 726 includes obtaining the amplitude and phase of the second portion of the spectrum of first harmonic 110-1 for each signal being measured. In some embodiments, operation 726 may be performed by measurement instrument 540 and/or processor 550.

An operation 728 includes obtaining the amplitude and phase of the downconverted pilot tone P1. In some embodiments, operation 728 may be performed by measurement instrument 540 and/or processor 550.

An operation 730 includes obtaining the amplitude and phase of the downconverted pilot tone P2. In some embodiments, operation 730 may be performed by measurement instrument 540 and/or processor 550.

An operation 732 includes calculating the adjusted or corrected phase of the second portion of the spectrum of first harmonic 110-1 of each signal which is being measured, by subtracting the phase of the downconverted pilot tone P2 from the measured phase of the second portion of the spectrum of first harmonic 110-1, and adding T1 to produce a phase-adjusted measurement of the second portion of the spectrum of first harmonic 110-1 of each signal which is being measured.

An operation 734 includes calculating a phase correction T2=Measured Phase of the downconverted pilot tone P1−Measured Phase of the downconverted pilot tone P2+T1.

An operation 736 includes setting the frequency of LO signal 5155 to LO3=LO1+2DF. In some embodiments, this operation may be performed by controller 505 sending a command to local oscillator 515 via communication bus 5055.

An operation 738 includes setting the frequency of pilot tone P2 to F1+3DF. In some embodiments, this operation may be performed by controller 505 sending a command to second signal generator 525 via communication bus 5055.

An operation 740 includes acquiring ADC data for all IF channels, and performing a discrete Fourier transform. For example, the ADC data for output signal 105 may be obtained by first measurement device 542 sampling the first IF signal in first IF channel 5325 at a sample rate, and digitizing the sample. In some embodiments, measurement instrument 540 or processor 550 performs a digital Fourier transform on the digitized samples of the first IF signal.

An operation 742 includes obtaining the amplitude and phase of the third portion of the spectrum of first harmonic 110-1 of each signal which is being measured. In some embodiments, operation 742 may be performed by measurement instrument 540 and/or processor 550.

An operation 744 includes obtaining the amplitude and phase of the downconverted pilot tone P1. In some embodiments, operation 744 may be performed by measurement instrument 540 and/or processor 550.

An operation 746 includes obtaining the amplitude and phase of the downconverted pilot tone P2. In some embodiments, operation 746 may be performed by measurement instrument 540 and/or processor 550.

An operation 748 includes calculating the adjusted or corrected phase of the third portion of the spectrum of first harmonic 110-1 of each signal being measured by subtracting the phase of the downconverted pilot tone P1 from the measured phase of the third portion of the spectrum of first harmonic 110-1 and adding T2 to produce a phase-adjusted measurement of the third portion of the spectrum of first harmonic 110-1 of each signal which is being measured.

An operation 750 includes calculating a phase correction T3=Measured Phase of the downconverted pilot tone P2−Measured Phase of the downconverted pilot tone P1+T2.

An operation 752 includes measuring an amplitude and phase of at least one downconverted comb tooth in the downconverted spectrum of first harmonic 110-1 from ADC data for reference channel 5365 obtained by third measurement device 546. Operation 752 may be performed concurrently with operations 708, 724 and 740.

An operation 754 includes stitching together the phase-adjusted first, second, and third portions of the spectra of first harmonic 110-1 of each signal being measured, as obtained above, to reconstruct the overall spectra of first harmonic 110-1 of each of the signals which is being measured.

An operation 756 includes repeating operations 702 through 754 with the frequency LO1 replaced by LO1+$f_C$ and the frequency F1 replaced by F1=$f_C$ to obtain a measurement of the second spectrum segment (e.g., second harmonic 110-2).

An operation 758 includes repeating operations 702 through 754 with the frequency LO1 replaced by LO1+2$f_C$ and the frequency F1 replaced by F1=2$f_C$ to obtain a measurement of the third spectrum segment (e.g., third harmonic 110-3).

An operation 760 includes using the measured phases of the downconverted comb teeth obtained in operation 752 and the known phase differences of the comb teeth in the comb signal to ascertain the relative phase responses between the plurality of output signal spectrum segments (e.g., first harmonic 110-1, second harmonic 110-2, and third harmonic 110-3).

Figure 8A:
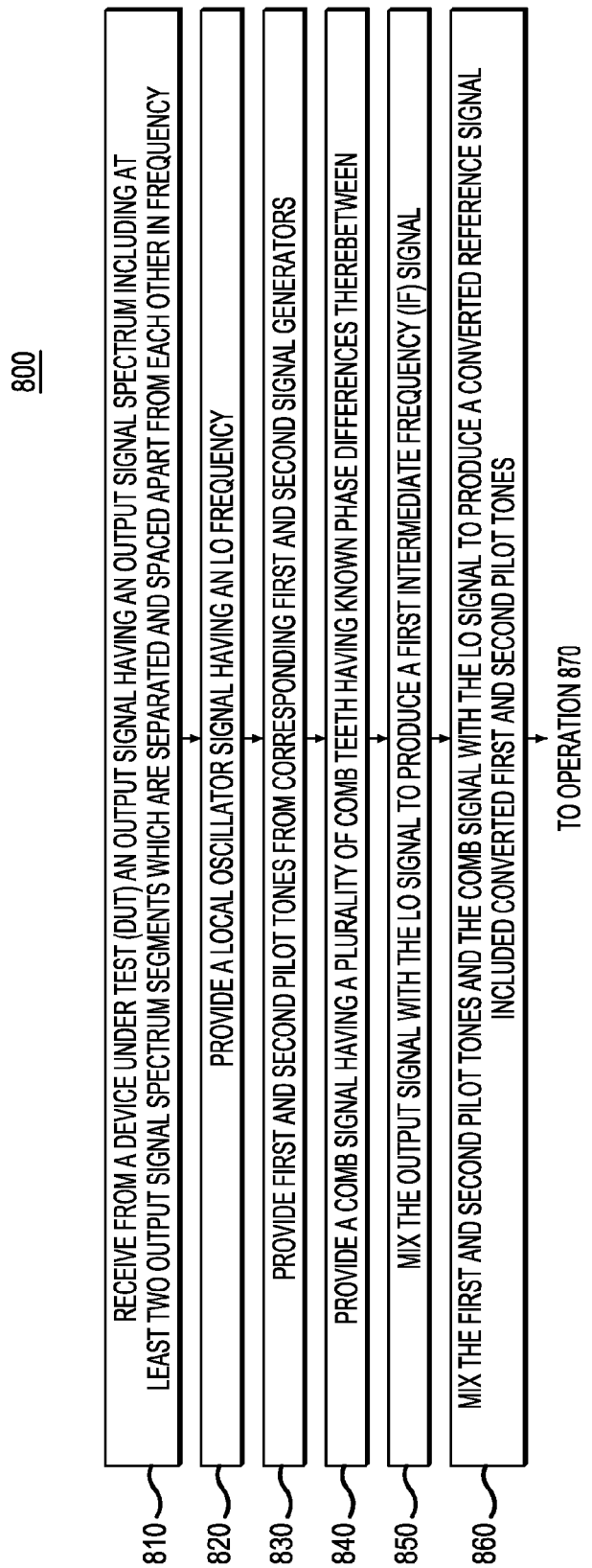
FIGS. 8A and 8B illustrate a series of operations which may be performed using the measurement system of FIG. 5 in one example embodiment of a method of measuring a spectrum of a signal from a device under test which includes multiple noncontiguous output signal spectrum segments, where the bandwidth of the measurement device is less than the bandwidth of the signal to be measured.
Figure 8B:
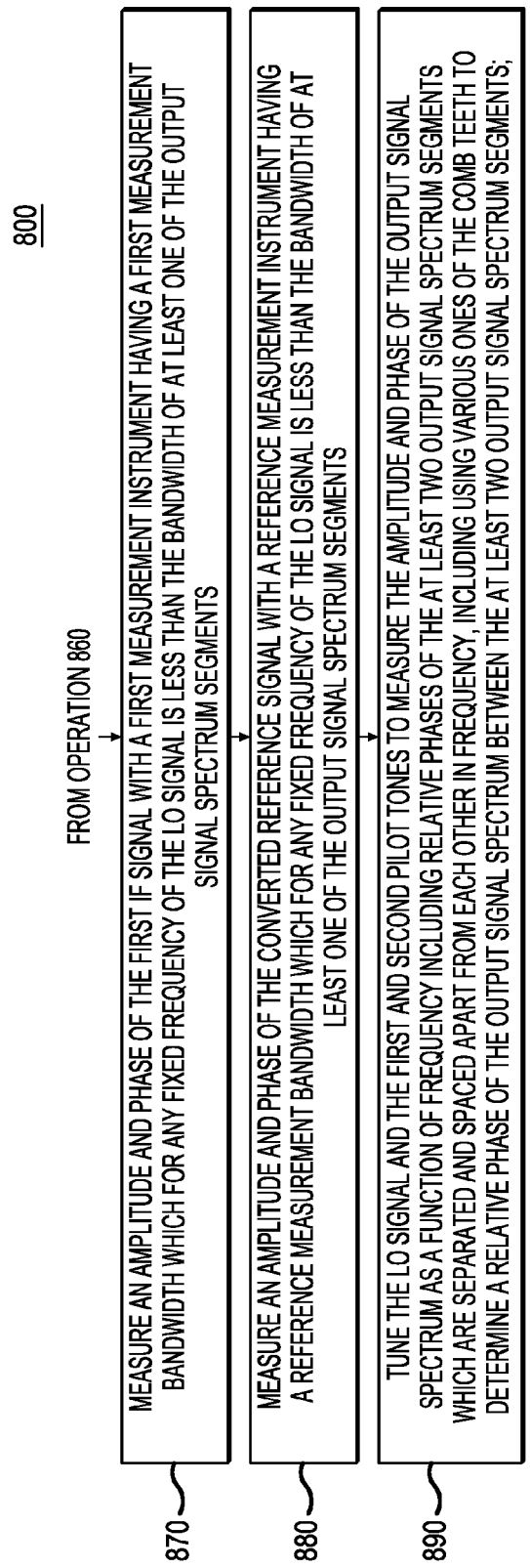

FIGS. 8A and 8B illustrate a series of operations which may be performed using the measurement system 500 of FIG. 5 in one example embodiment of a method of measuring a spectrum of a signal from a device under test which includes multiple noncontiguous output signal spectrum segments, where the bandwidth of the measurement device is less than the bandwidth of the signal to be measured.

An operation 810 may include receiving from device under test (DUT) 10 output signal 105 having an output signal spectrum including at least two output spectrum segments (e.g., harmonics) which are separated and spaced apart from each other in frequency.

An operation 820 may include providing local oscillator (LO) signal 5115 having an LO frequency.

An operation 830 may include providing first and second pilot tones 5205 and 5255 from corresponding first and second signal generators 520 and 525.

An operation 840 may include providing a comb signal 5295 having a plurality of comb teeth having known phase differences therebetween.

An operation 850 may include mixing output signal 105 with LO signal 5115 to produce a first intermediate frequency (IF) signal.

An operation 860 may include mixing first and second pilot tones 5205 and 5255 and comb signal 5295 with LO signal 5155 to produce a converted reference signal including converted first and second pilot tones.

An operation 870 may include measuring an amplitude and phase of the first IF signal with first measurement device 542 having a first measurement bandwidth which for any fixed frequency of LO signal 5155 is less than the bandwidth of at least one of the output signal spectrum segments.

An operation 880 may include measuring an amplitude and phase of the converted reference signal with reference measurement device 546 having a second measurement bandwidth which for any fixed frequency of LO signal 5155 is less than the bandwidth of at least one of the output signal spectrum segments.

An operation 890 may include tuning LO signal 5155 and first and second pilot tones 5205 and 5255 to measure the amplitude and phase of the output signal spectrum as a function of frequency including relative phases of the at least two output signal spectrum segments which are separated and spaced apart from each other in frequency, including using various ones of the comb teeth to determine a relative phase of the output signal spectrum between the at least two output signal spectrum segments.

The method 800 may include other operations, for example stitching together the phase-adjusted measurements of the IF signal to produce a measurement of the amplitude and phase of the output signal across the output spectrum as a function of frequency, operations related to characterizing a second signal (e.g., input signal 55 in response to which DUT 10 generates output signal 105; a reflected signal produced from the input of the DUT 10; a reflected signal produced from the output of DUT 10; etc.) in addition to output signal 105, etc.

The example embodiments described above employ measurement of two pilot tones for elimination of type 1 phase shifts. However, other embodiments may employ measurements of a single pilot tone for elimination of type 1 phase shifts. The trade-off here is that use of a single tone may reduce the number of signal generators from two to one at the expense of additional measurements which may increase the overall measurement time.

In that case, second signal generator 525 and second pilot tone 5255 may be omitted.

Figure 9:
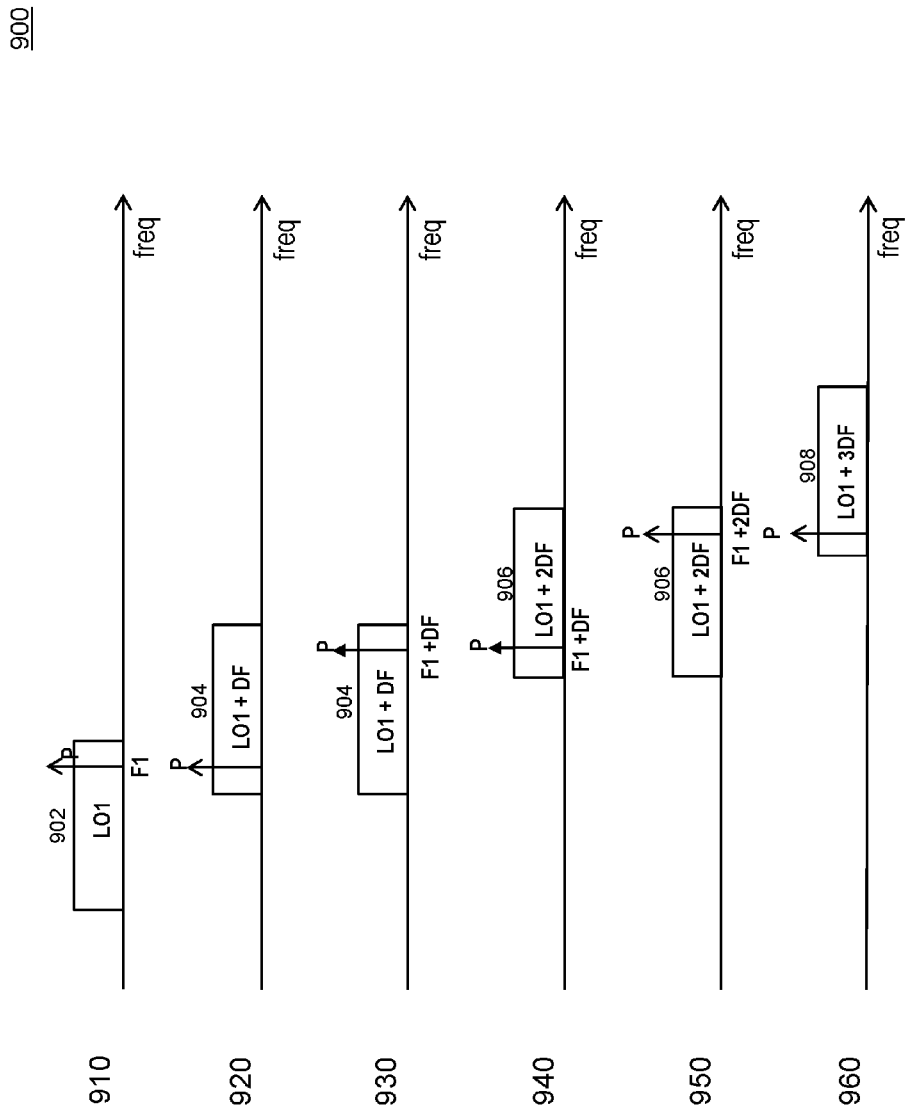
FIG. 9 illustrates an example embodiment of a method of measuring a spectrum segment (e.g., one harmonic) of a signal from a device under test, where the bandwidth of the measurement device is less than the bandwidth of the spectrum segment to be measured, by stitching together measurements of four overlapping portions of the spectrum segment using a single pilot tone.

FIG. 9 illustrates an example embodiment of a method 900 of measuring one spectrum segment (e.g., one harmonic) of a signal output by a device under test, where the bandwidth of the measurement device is less than the bandwidth of the spectrum segment to be measured, by stitching together measurements of four overlapping portions of the spectrum segment using a single pilot tone. In particular, FIG. 9 illustrates an example embodiment of a method of eliminating type 1 phase shifts using a single pilot tone. This method may be combined with the measured phases of the converted comb teeth HPR1, HPR2, and HPR3 in reference channel 5365 for each of the output signal spectrum segments and the known phase differences of comb teeth HPR1, HPR2, and HPR3 in comb signal 5295, as described above for eliminating the type 2 phase shifts. Although FIG. 9 and the description to follow pertain only to measurement an output signal spectrum segment, it should be understood that the same procedure may be applied to measure a spectrum segment of a second signal (e.g., second signal 65, which may be a reflected output signal from the output port of DUT 10) at the same time as measuring the output signal spectrum segment.

In an operation 910, when measuring a first portion 902 of the spectrum segment (e.g., first portion 402 in FIG. 4A), the LO frequency of LO signal 5155 is set (e.g. by controller 305) to L01. The frequency of pilot tone 5205 (also referred to as P) is set (e.g., by controller 505) to a frequency F1 such that the downconverted pilot tone 5205 appears in the upper part of reference channel 5365 (which mirrors first IF channel 5325), in particular a region (e.g., overlap region 403) of first portion 902 of the spectrum segment which overlaps with a second portion 904 of the spectrum segment (e.g., second portion 404 in FIGS. 4A-4C) to be measured next. Measurement instrument 540 measures the first IF signal in first IF channel 5325 representing the downconverted first portion 902 of output signal 105, and measures the downconverted pilot tone 5205 in reference channel 5365. Measurement instrument 540 or processor 550 obtains the amplitude and phase ($PH_O1$) of the downconverted first portion 902 of the spectrum segment of output signal 105, and the amplitude and phase (P1) of the downconverted pilot tone 5205. Measurement instrument 540 or processor 550 sets the corrected phase ($C_O1$) of the first portion 902 of the spectrum segment of output signal 105 to equal $PH_O1$. The phase-adjusted data for first portion 902 of the spectrum segment of output signal 105 may be stored in memory.

Next, in an operation 920, the LO frequency of LO signal 5155 is set (e.g., by controller 505) to LO2=LO1+DF. The frequency of pilot tone 5205 is maintained to be substantially the same as in the immediately preceding conversion or operation 910. Here, when we say that the frequency of pilot tone 5205 is maintained to be substantially the same as in an immediately preceding conversion, this indicates that the frequency remains the same except for any minor frequency drift within the tolerances of signal generator 520. For example, controller 305 may not issue any command in operation 920 to signal generator 520 to change the frequency of pilot tone 5205, and accordingly signal generator 520 continues to output pilot tone 5205 whose frequency is not changed with respect to immediately preceding operation 910. As explained below, by maintaining the frequency of pilot tone 5205 unchanged between operations 910 and 920, a reference point can be established for factoring out an effect caused by a change in the phase of LO signal 5155 which occurs in general between operations 910 and 920 due to the output frequency of local oscillator 515 being changed or reprogrammed, for example by controller 505.

Because the frequency of LO signal 5155 is changed in operation 920 while the frequency of pilot tone 5205 remains substantially unchanged, downconverted pilot tone 5205 now appears in the lower part of reference channel 5365 (which, again, mirrors first IF channel 5325), in particular it appears in an overlap region (e.g., overlap region 403) of second portion 904 of the spectrum segment which overlaps with first portion 902 of the spectrum segment which was measured in operation 910. Measurement instrument 540 measures the first IF signal in first IF channel 5325 representing the downconverted second portion 904 of the spectrum segment of output signal 105, and measures the downconverted pilot tone 5205 in reference channel 5365. Measurement instrument 540 or processor 550 obtains the amplitude and phase ($PH_O2$) of the downconverted second portion of the spectrum segment of output signal 105 and the amplitude and phase (P2) of the downconverted pilot tone 5205. Measurement instrument 540 or processor 550 calculates a phase correction or fixed phase shift, T1, to be applied to the measured spectrum of second portion 904 of the spectrum segment of output signal 105, which may be stored in memory. Here, T1=P1−P2. Measurement instrument 540 or processor 550 calculates the adjusted (or corrected) phase ($C_O2$) of second portion 904 of the spectrum segment of output signal 105 to equal $PH_O2$+ T1. The phase-adjusted data for second portion 904 of the spectrum segment of output signal 105 may be stored in memory.

Next, in an operation 930, the frequency of pilot tone 5205 is adjusted or changed (e.g., by controller 505) to a frequency F1+DF such that the downconverted pilot tone 5205 now appears again in the upper part of second IF channel 5345, in particular a region (e.g., overlap region 405) of second portion 904 of the spectrum segment which overlaps with a third portion 906 of the spectrum segment (e.g., third portion 406 in FIGS. 4A, 4B and 4D) to be measured next. Measurement instrument 540 measures the downconverted pilot tone 5205 in reference channel 5365, and measurement instrument 540 or processor 550 obtains the amplitude and phase (P3) of the downconverted pilot tone 5205. The value of P3 may be stored in memory.

Next, in an operation 940, the LO frequency of LO signal 3155 is set (e.g., by controller 305) to LO3=LO1+2DF. The frequency of pilot tone 3205 is maintained to be substantially the same as in the immediately preceding conversion or operation 930. Because the frequency of LO signal 3155 is changed in operation 940 while the frequency of pilot tone 3205 remains substantially unchanged, downconverted pilot tone 3205 now appears again in the lower part of second IF channel 3345, in particular a region (e.g., overlap region 205) of third portion 906 of the spectrum segment which overlaps with second portion 904 of the spectrum segment which was measured in operation 920. Measurement instrument 540 measures the first IF signal in first IF channel 5325 representing the downconverted third portion 906 of the spectrum segment of output signal 105 and the downconverted pilot tone 5205 in reference channel 5365. Measurement instrument 540 or processor 550 obtains the amplitude and phase ($PH_O3$) of the downconverted third portion 906 of the spectrum segment of output signal 105, and measures the amplitude and phase (P4) of the downconverted pilot tone 5205. Measurement instrument 540 or processor 550 calculates a phase correction or fixed phase shift, T2, to be applied to the measured spectrum of third portion 906 of the spectrum segment of output signal 105, which may be stored in memory. Here, T2=T1+P3−P4. Measurement instrument 540 or processor 550 calculates the adjusted (or corrected) phase ($C_I3$) of the third portion of the spectrum of input signal 55 to equal $PH_I3+T2$, and calculates the adjusted (or corrected) phase ($C_O3$) of the third portion of the spectrum of output signal 105 to equal $PH_O3+T2$. The phase-adjusted data for third portion 906 of the spectrum of output signal 105 may be stored in memory.

Next, in an operation 950, the frequency of pilot tone 5205 is adjusted or changed (e.g., by controller 505) to a frequency F1+2DF such that the downconverted pilot tone 5205 now appears again in the upper part of second IF channel 5345, in particular a region (e.g., overlap region 407) of third portion 906 of the spectrum segment which overlaps with a fourth portion 908 of the spectrum segment (e.g., fourth portion 408 in FIGS. 4A, 4C and 4E) to be measured next. Measurement instrument 540 measures the downconverted pilot tone 5205 in reference channel 5365, and measurement instrument 540 or processor 550 obtains the amplitude and phase (P5) of the downconverted pilot tone 5205. The value of P5 may be stored in memory.

Next, in an operation 960, the LO frequency of LO signal 5155 is set (e.g., by controller 505) to LO3=LO1+3DF. The frequency of pilot tone 5205 is maintained to be substantially the same as in the immediately preceding conversion or operation 950. Because the frequency of LO signal 5155 is changed in operation 960 while the frequency of pilot tone 5205 remains substantially unchanged, downconverted pilot tone 5205 now appears again in the lower part of second IF channel 5345, in particular a region (e.g., overlap region 407) of fourth portion 908 of the spectrum segment which overlaps with third portion 906 of the spectrum segment which was measured in operation 940. Measurement instrument 540 measures the first IF signal in first IF channel 5325 representing the downconverted fourth portion of output signal 105 and measures the downconverted pilot tone 5205 in reference channel 5365. Measurement instrument 540 or processor 550 obtains the amplitude and phase ($PH_O4$) of the downconverted fourth portion of the spectrum segment of output signal 105 and the amplitude and phase (P6) of the downconverted pilot tone 5205. Measurement instrument 540 or processor 550 calculates a phase correction or fixed phase shift, T3, to be applied to the measured spectrum of fourth portion 908 of the spectrum segment of output signal 105, which may be stored in memory. Here, T3=T2+P5−P6. Measurement instrument 540 or processor 550 calculates the adjusted (or corrected) phase ($C_O4$) of fourth portion 908 of the spectrum segment of output signal 105 to equal $PH_O4+T3$. The phase-adjusted data for fourth portion 908 of the spectrum segment of output signal 105 may be stored in memory.

In general, this procedure is repeated until all N portions of the spectrum segment of output signal 105 are measured. The phase-adjusted data for all N portions of the spectrum segment of output signal 105 are stitched together to produce the output signal spectrum segment, with the type 1 phase shifts (due to LO 515 changing frequencies while measuring different portions of the spectrum segment) eliminated, Meanwhile, the type 2 phase shifts (due to LO 515 changing frequencies while measuring different spectrum segments) are eliminated by the same procedure described above with respect to FIG. 6 which uses comb teeth HPR1, HPR2, and HPR3 in comb signal 5295.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method, comprising:

receiving from a device under test an output signal having an output signal spectrum which includes at least two output signal spectrum segments which are separated and spaced apart from each other in frequency;

providing first and second pilot tones;

providing a comb signal having a plurality of comb teeth having known phase differences therebetween;

combining the first and second pilot tones and the comb signal to produce a reference signal;

for each of the output signal spectrum segments:

sequentially converting portions of the output signal spectrum segment down to a first intermediate frequency (IF) signal in a first IF channel by mixing the output signal with a local oscillator (LO) signal, wherein a frequency of the LO signal is changed for each sequential conversion, and measuring an amplitude and phase of the first IF signal as a function of frequency for each of the sequentially converted portions of the output signal spectrum segment using a measurement device whose measurement bandwidth for any fixed frequency of the LO signal is less than the bandwidth of the output signal spectrum segment and is also less than an amount by which the output signal spectrum segments are separated and spaced apart from each other in frequency;

during each sequential conversion, mixing the reference signal, including the first and second pilot tones, with the LO signal to produce converted first and second pilot tones, selecting frequencies of the first and second pilot tones such that for each sequential conversion the converted first and second pilot tones are spaced apart from each other within a reference channel, wherein for each sequential conversion a frequency of one of the first and second pilot tones does not change from an immediately preceding conversion, and a frequency of another one of the first and second pilot tones does change from the immediately preceding conversion, wherein the one of the first and second pilot tones which does not change alternates from sequential conversion to sequential conversion, and wherein for at least one of the sequential conversions, mixing the reference signal with the LO signal produces at least one converted comb tooth in the reference channel;

measuring a phase of the converted comb tooth in the reference channel for at least one of the sequential conversions;

measuring a phase of each of the converted first and second pilot tones in the reference channel for each sequential conversion;

adjusting the measured phase of the first IF signal as a function of frequency for one or more of the sequentially converted portions of the output signal spectrum segment using the measured phases of the converted first and second pilot tones to produce phase-adjusted measurements of the IF signal; and stitching together the phase-adjusted measurements of the first IF signal to produce a measurement of the amplitude and phase of the output signal spectrum segment as a function of frequency; and ascertaining relative phase differences between the plurality of output signal spectrum segments using the measured phases of the converted comb teeth in the reference channel for each of the output signal spectrum segments and the known phase differences between the comb teeth in the comb signal.

2. The method of claim 1, wherein a first IF bandwidth of the first IF channel is approximately the same as a reference bandwidth of the reference channel.

3. The method of claim 1, wherein an amount by which the frequency of the LO signal is changed for each sequential conversion is about equal to a difference between the frequencies of the first and second pilot tones.

4. The method of claim 3, wherein the frequency of the one of the first and second pilot tones which does change from the immediately preceding conversion changes by about twice the amount by which the frequency of the LO signal is changed from the immediately preceding measurement.

5. The method of claim 1, wherein adjusting the measured phase of the first IF signal as a function of frequency for one or more of the sequentially converted portions of the output signal spectrum segment using the measured phases of the converted first and second pilot tones comprises:
for at least a current one of the sequential conversions, determining a phase adjustment to be applied to the measured phase of the first IF signal as a function of frequency as a difference between: (1) the phase of the one of the first and second pilot tones which does change from the immediately preceding conversion, as measured for the current sequential conversion, and (2) the phase of the one of the first and second pilot tones which does change from the immediately preceding conversion, as measured for an immediately preceding sequential conversion; and
applying the determined phase adjustment to the measured phase of the first IF signal as a function of frequency for the current sequential conversion.

6. The method of claim 1, further comprising:
receiving a second signal, having a second signal spectrum comprising a plurality of second signal spectrum segments which are separated and spaced apart from each other in frequency;
for each of the plurality of second signal spectrum segments:
during each sequential conversion of the portions of the output signal spectrum segment, sequentially converting portions of the second signal spectrum segment down to a second intermediate frequency (IF) signal in a second IF channel by mixing the second signal with the LO signal, and measuring an amplitude and phase of the second IF signal as a function of frequency for each of the sequentially converted portions of the second signal spectrum segment using a second measurement device whose measurement bandwidth for any fixed frequency of the LO signal is less than the output signal bandwidth and is also less than an amount by which the output signal spectrum segments are separated and spaced apart from each other in frequency;
adjusting the measured phase of the second IF signal as a function of frequency for one or more of the sequentially converted portions of the second signal spectrum segment using the measured phases of the converted first and second pilot tones to produce phase-adjusted measurements of the second IF signal; and
stitching together the phase-adjusted measurements of the second IF signal to produce a measurement of the amplitude and phase of the second signal across the second signal spectrum segment as a function of frequency; and
ascertaining relative phase differences between the plurality of second signal spectrum segments using the measured phases of the converted comb teeth in the reference channel for each of the second signal spectrum segments and the known phase differences between the comb teeth in the comb signal,
wherein the second signal is one of: an input signal which is also supplied to an input of the device under test and in response to which the device under test generates the output signal; a reflected signal produced from the input of the device under test; and a reflected signal produced from the output of the device under test.

7. A system for measuring at least one characteristic of an output signal of a device under test, the output signal having an output signal spectrum which includes at least two output signal spectrum segments which are separated and spaced apart from each other in frequency, the system comprising:
a local oscillator (LO) configured to generate an LO signal having an LO frequency;
a first signal generator configured to generate a first pilot tone;
a comb signal generator configured to generate a comb signal having a plurality of comb teeth having known phase differences therebetween;
a first frequency converter configured to mix the output signal with the LO signal to produce an intermediate frequency (IF) signal in a first IF channel;
a reference frequency converter configured to mix a reference signal including the first pilot tone and the comb signal with the LO signal to produce a converted first pilot tone within a reference channel;
a first measurement device connected to an output of the first frequency converter, the first measurement device having a first measurement bandwidth which for any fixed frequency of the LO signal is less than a bandwidth of at least one of the output signal spectrum segments;
a reference measurement device connected to an output of the reference frequency converter, the reference measurement device having a reference measurement bandwidth which for any fixed frequency of the LO signal is less than the bandwidth of the at least one of the output signal spectrum segments;
a controller configured to control tuning of the LO and the first signal generator to measure an amplitude and phase of the output signal spectrum as a function of frequency including relative phases of the at least two output signal spectrum segments which are separated and spaced apart from each other in frequency, including using various ones of the comb teeth to determine a relative phase of the output signal spectrum between the at least two output signal spectrum segments.

8. The system of claim 7, wherein the first measurement bandwidth of the first measurement device is approximately the same as the reference measurement bandwidth of the reference measurement device, and wherein the first measurement bandwidth for any fixed frequency of the LO signal is less than the bandwidths of both of the at least two output signal spectrum segments.

9. The system of claim 7, further comprising a second signal generator configured to generate a second pilot tone, wherein the reference signal includes the second pilot tone, wherein the reference frequency converter is further configured to mix the second pilot tone with the LO signal to produce a converted second pilot tone within the reference channel, and wherein the controller is configured to control the system to execute a procedure comprising:

for each of the output signal spectrum segments:
sequentially converting portions of the output signal spectrum segment down to the intermediate frequency (IF) signal in the first IF channel by mixing the output signal with the local oscillator (LO) signal, wherein a frequency of the LO signal is changed for each sequential conversion, and measuring an amplitude and phase of the IF signal as a function of frequency for each of the sequentially converted portions of the output signal spectrum segment using the first measurement device;
during each sequential conversion, mixing the reference signal, including the first and second pilot tones, with the LO signal to produce the converted first and second pilot tones, selecting frequencies of the first and second pilot tones such that for each sequential conversion the converted first and second pilot tones are spaced apart from each other within the reference channel, wherein for each sequential conversion a frequency of one of the first and second pilot tones does not change from an immediately preceding conversion, and a frequency of another one of the first and second pilot tones does change from the immediately preceding conversion, wherein the one of the first and second pilot tones which does not change alternates from sequential conversion to sequential conversion, and wherein for at least one of the sequential conversions, mixing the reference signal with the LO signal produces at least one converted comb tooth in the reference channel;
measuring a phase of the converted comb tooth in the reference channel for at least one of the sequential conversions;
measuring a phase of each of the converted first and second pilot tones in the reference channel for each sequential conversion;
adjusting the measured phase of the IF signal as a function of frequency for one or more of the sequentially converted portions of the output signal spectrum segment using the measured phases of the converted first and second pilot tones to produce phase-adjusted measurements of the IF signal; and
stitching together the phase-adjusted measurements of the IF signal to produce a measurement of the amplitude and phase of the output signal spectrum segment as a function of frequency; and
ascertaining relative phase differences between the plurality of output signal spectrum segments using the measured phases of the converted comb teeth in the reference channel for each of the output signal spectrum segments and the known phase differences between the comb teeth in the comb signal.

10. The system of claim 9, wherein the controller is configured to change the LO frequency for each sequential conversion by an amount about equal to a difference between the frequencies of the first and second pilot tones.

11. The system of claim 10, wherein the controller is configured to change the frequency of the one of the first and second pilot tones which does change from the immediately preceding conversion by about twice the amount by which the controller changes the frequency of the LO signal.

12. The system of claim 9, wherein the system is configured to adjust the measured phase of the IF signal as a function of frequency for one or more of the sequentially converted portions of the output signal spectrum using the measured phases of the converted first and second pilot tones by:

for at least a current one of the sequential conversions, determining a phase adjustment to be applied to the measured phase of the IF signal as a function of frequency as a difference between: (1) the phase of the one of the first and second pilot tones which does change from the immediately preceding conversion, as measured for the current sequential conversion, and (2) the phase of the one of the first and second pilot tones which does change from the immediately preceding conversion, as measured for an immediately preceding sequential conversion; and
applying the determined phase adjustment to the measured phase of the IF signal as a function of frequency for the current sequential conversion.

13. The system of claim 7, wherein the controller is configured to control the system to execute a procedure comprising:

for each of the output signal spectrum segments:
sequentially converting portions of the output signal spectrum segment down to the intermediate frequency (IF) signal in the first IF channel by mixing the output signal with the local oscillator (LO) signal, wherein a frequency of the LO signal is changed for each sequential conversion, and measuring an amplitude and phase of the IF signal as a function of frequency for each of the sequentially converted portions of the output signal spectrum using the first measurement device, wherein for at least one of the sequential conversions, mixing the reference signal with the LO signal produces at least one converted comb tooth in the reference channel;
measuring a phase of the converted comb tooth in the reference channel for at least one of the sequential conversions;
during at least some of the sequential conversions,
measuring a first phase of the converted first pilot tone with the converted first pilot tone at a first frequency in the reference channel prior to changing the frequency of the LO signal,
measuring a second phase of the converted first pilot tone with the converted first pilot tone at a second frequency in the reference channel subsequent to changing the frequency of the LO signal, where the frequency of the first pilot tone is maintained to be substantially the same in measuring the first phase of the converted first pilot tone as in measuring the second phase of the converted first pilot tone, and
after measuring the first and second phases of the converted first pilot tone, and before changing the frequency of the LO signal again, changing the frequency of the first pilot tone such that the converted first pilot tone is at the first frequency in the reference channel;
adjusting the measured phase of the IF signal as a function of frequency for one or more of the sequentially converted portions of the output signal spectrum segment using the measured first and second phases of the first pilot tone to produce phase-adjusted measurements of the IF signal; and stitching together the phase-adjusted measurements of the IF signal to produce a measurement of the amplitude and phase of the output signal across the output signal spectrum segment as a function of frequency; and ascertaining relative phase differences between the plurality of output signal spectrum segments using the measured phases of the converted comb teeth in the reference channel for each of the output signal spectrum segments and the known phase differences between the comb teeth in the comb signal.

14. A method, comprising:

receiving from a device under test an output signal having an output signal spectrum which includes at least two output signal spectrum segments which are separated and spaced apart from each other in frequency;

providing a local oscillator signal having an LO frequency;

providing a comb signal having a plurality of comb teeth having known phase differences therebetween;

providing a reference signal including the comb signal and at least a first pilot tone;

mixing the output signal with the LO signal to produce an intermediate frequency (IF) signal;

mixing the reference signal including the first pilot tone and the comb signal with the LO signal to produce a converted reference signal including a converted first pilot tone in a reference channel;

measuring an amplitude and phase of the IF signal with a first measurement device having a first measurement bandwidth which for any fixed frequency of the LO signal is less than a bandwidth of at least one of the output signal spectrum segments;

measuring an amplitude and phase of the converted reference signal with a reference measurement device having a second measurement bandwidth which for any fixed frequency of the LO signal is less than the bandwidth of at least one of the output signal spectrum segments; and tuning the LO signal and the first pilot tone to measure an amplitude and phase of the output signal spectrum as a function of frequency including relative phases of the at least two output signal spectrum segments which are separated and spaced apart from each other in frequency, including using various ones of the comb teeth to determine a relative phase of the output signal spectrum between the at least two output signal spectrum segments.

15. The method of claim 14, wherein the reference signal further includes a second pilot tone, wherein the converted reference signal includes a converted second pilot tone, and wherein the method includes tuning the LO signal and the first and second pilot tones to measure the amplitude and phase of the output signal spectrum as a function of frequency.

16. The method of claim 15, wherein tuning the LO signal and the first and second pilot tones to measure the amplitude and phase of the output signal spectrum as a function of frequency including relative phases of the at least two output signal spectrum segments which are separated and spaced apart from each other in frequency includes:

tuning the LO signal and the first and second pilot tones to measure the amplitude and phase of a first one of the output signal spectrum segments as a function of frequency, and to measure a phase of a first one of the comb teeth;

tuning the LO signal and the first and second pilot tones to measure the amplitude and phase of a second one of the output signal spectrum segments as a function of frequency, and to measure a phase of a second one of the comb teeth; and using the measured phases of the first and second comb teeth to ascertain a relative phase between the first one of the output signal spectrum segments and the second one of the output signal spectrum segments.

17. The method of claim 16, wherein tuning the LO signal and the first and second pilot tones to measure the amplitude and phase of a first one of the output signal spectrum segments as a function of frequency includes using the first and second pilot tones to determine phase relationships between portions of the first output signal spectrum segment which are measured sequentially by tuning the LO signal to different frequencies.

18. The method of claim 15, further comprising:

for each of the output signal spectrum segments:

sequentially converting portions of the output signal spectrum segment down to the intermediate frequency (IF) signal in a first IF channel by mixing the output signal with the local oscillator (LO) signal, wherein a frequency of the LO signal is changed for each sequential conversion, and measuring an amplitude and phase of the first IF signal as a function of frequency for each of the sequentially converted portions of the output signal spectrum segment;

during each sequential conversion, mixing the first and second pilot tones and the comb signal with the LO signal to produce converted first and second pilot tones, selecting frequencies of the first and second pilot tones such that for each sequential conversion the converted first and second pilot tones are spaced apart from each other within the reference channel, wherein for each sequential conversion a frequency of one of the first and second pilot tones does not change from an immediately preceding conversion, and a frequency of another one of the first and second pilot tones does change from the immediately preceding conversion, wherein the one of the first and second pilot tones which does not change alternates from sequential conversion to sequential conversion, and wherein for at least one of the sequential conversions, mixing the reference signal with the LO signal produces at least one converted comb tooth in the reference channel;

measuring a phase of each of the converted first and second pilot tones in the reference channel for each sequential conversion;

adjusting the measured phase of the first IF signal as a function of frequency for one or more of the sequentially converted portions of the output signal spectrum segment using the measured phases of the converted first and second pilot tones to produce phase-adjusted measurements of the IF signal; and stitching together the phase-adjusted measurements of the first IF signal to produce a measurement of the amplitude and phase of the output signal spectrum segment as a function of frequency.

19. The method of claim 18, further comprising measuring a phase of the converted comb tooth in the reference channel for at least one of the sequential conversions, and using the measured phase of the converted comb tooth to the ascertain a relative phase between the first one of the output signal spectrum segments and the second one of the output signal spectrum segments.

20. The method of claim 14, further comprising:

for each of the output signal spectrum segments:

sequentially converting portions of the output signal spectrum segment down to the intermediate frequency (IF) signal in the first IF channel by mixing the output signal with the local oscillator (LO) signal, wherein a frequency of the LO signal is changed for each sequential conversion, and measuring an amplitude and phase of the IF signal as a function of frequency for each of the sequentially converted portions of the output signal spectrum using the first measurement device, wherein for at least one of the sequential conversions, mixing the reference signal with the LO signal produces at least one converted comb tooth in the reference channel;

measuring a phase of the converted comb tooth in the reference channel for at least one of the sequential conversions;

during at least some of the sequential conversions, measuring a first phase of the converted first pilot tone with the converted first pilot tone at a first frequency in the reference channel prior to changing the frequency of the LO signal, measuring a second phase of the converted first pilot tone with the converted first pilot tone at a second frequency in the reference channel subsequent to changing the frequency of the LO signal, where the frequency of the first pilot tone is maintained to be substantially the same in measuring the first phase of the converted first pilot tone as in measuring the second phase of the converted first pilot tone, and after measuring the first and second phases of the converted first pilot tone, and before changing the frequency of the LO signal again, changing the frequency of the first pilot tone such that the converted first pilot tone is at the first frequency in the reference channel;

adjusting the measured phase of the IF signal as a function of frequency for one or more of the sequentially converted portions of the output signal spectrum segment using the measured first and second phases of the first pilot tone to produce phase-adjusted measurements of the IF signal; and stitching together the phase-adjusted measurements of the IF signal to produce a measurement of the amplitude and phase of the output signal across the output signal spectrum segment as a function of frequency; and ascertaining relative phase differences between the plurality of output signal spectrum segments using the measured phases of the converted comb teeth in the reference channel for each of the output signal spectrum segments and the known phase differences between the comb teeth in the comb signal.

* * * * *